(12) United States Patent
Zhu et al.

(10) Patent No.: US 11,277,479 B2
(45) Date of Patent: Mar. 15, 2022

(54) COMMUNICATION METHOD AND COMMUNICATIONS DEVICE

(71) Applicant: HUAWEI TECHNOLOGIES CO., LTD., Guangdong (CN)

(72) Inventors: Qianghua Zhu, Beijing (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/100,517

(22) Filed: Nov. 20, 2020

(65) Prior Publication Data
US 2021/0075865 A1 Mar. 11, 2021

Related U.S. Application Data

(63) Continuation of application No. PCT/CN2019/083367, filed on Apr. 19, 2019.

(30) Foreign Application Priority Data

May 21, 2018 (CN) .......................... 201810490764.1

(51) Int. Cl.
*H04L 29/08* (2006.01)
*H04L 12/741* (2013.01)
(Continued)

(52) U.S. Cl.
CPC .............. *H04L 67/14* (2013.01); *H04L 45/74* (2013.01); *H04L 61/20* (2013.01); *H04L 61/6022* (2013.01)

(58) Field of Classification Search
CPC ......... H04L 67/14; H04L 45/74; H04L 61/20; H04L 61/6022
(Continued)

(56) References Cited

U.S. PATENT DOCUMENTS

2015/0365285 A1* 12/2015 Phillips ................ H04W 76/20
370/254
2017/0288972 A1* 10/2017 Li ........................ H04W 40/205
(Continued)

FOREIGN PATENT DOCUMENTS

CN 105637905 A 6/2016
JP 2007521741 A 8/2007
(Continued)

OTHER PUBLICATIONS

3GPP TS 23.501 V15.1.0 (Mar. 2018), "3rd Generation Partnership Project;Technical Specification Group Services and System Aspects-;System Architecture for the 5G System;Stage 2(Release 15)," Mar. 2018, 201 pages.
(Continued)

*Primary Examiner* — James E Springer
(74) *Attorney, Agent, or Firm* — Fish & Richardson P.C.

(57) ABSTRACT

This application provides a communication method and a communications device. The method includes: obtaining a media access control (MAC) address that is of a terminal device and that is bound to a session and first route information of an interface, corresponding to the session, between a user plane function network element and a data network; and sending, to an application function network element or a gateway of the data network, the MAC address that is of the terminal device and that is bound to the session and the first route information.

20 Claims, 21 Drawing Sheets

(51) Int. Cl.
   *H04L 29/12* (2006.01)
   *H04L 67/14* (2022.01)
   *H04L 45/74* (2022.01)
   *H04L 61/50* (2022.01)
   *H04L 101/622* (2022.01)

(58) Field of Classification Search
   USPC .......................................................... 709/227
   See application file for complete search history.

(56) References Cited

U.S. PATENT DOCUMENTS

| | | | |
|---|---|---|---|
| 2018/0034815 A1 | 2/2018 | Thomas et al. | |
| 2018/0115928 A1 | 4/2018 | Kim et al. | |
| 2018/0139107 A1 | 5/2018 | Senarath et al. | |
| 2018/0332494 A1* | 11/2018 | Hou | H04W 76/10 |
| 2019/0109721 A1* | 4/2019 | Qiao | H04L 63/0254 |
| 2019/0296966 A1* | 9/2019 | Gao | H04L 45/28 |
| 2020/0205225 A1* | 6/2020 | Hu | H04L 47/263 |
| 2021/0051761 A1* | 2/2021 | Kahn | H04W 76/12 |

FOREIGN PATENT DOCUMENTS

| | | | |
|---|---|---|---|
| JP | 2017017375 A | 1/2017 | |
| JP | 2017135545 A | 8/2017 | |
| WO | 2008138274 A1 | 11/2008 | |
| WO | 2017220132 A1 | 12/2017 | |

OTHER PUBLICATIONS

3GPP TS 23.502 V15.1.0 (Mar. 2018), "3rd Generation Partnership Project;Technical Specification Group Services and System Aspects;Procedures for the 5G System;Stage 2(Release 15)," Mar. 2018, 285 pages.
3GPP TS 23.503 V15.1.0 (Mar. 2018), "3rd Generation Partnership Project;Technical Specification Group Services and System Aspects;Policy and Charging Control Framework for the 5G System;Stage 2(Release 15)," Mar. 2018, 65 pages.
3GPP TS 29.244 V15.1.0 (Mar. 2018), "3rd Generation Partnership Project;Technical Specification Group Core Network and Terminals;Interface between the Control Plane and the User Plane Nodes;Stage 3(Release 15)," Mar. 2018, 170 pages.
Huawei, Hisilicon, "Resource management of UPF shared by multiple SMFs," SA WG2 Meeting #127, S2-183458, Sanya, China, Apr. 16-20, 2018, 5 pages.
Huawei, HiSilicon, "Select the same SMF+UPF for PDU Sessions of the same DNN," 3GPP TSG-SA WG2 Meeting #127, S2-183450, Sanya, China, Apr. 16-20, 2018, 5 pages.
Huawei, Hisilicon, "Resource management of UPF shared by multiple SMFs," SA WG2 Meeting #127, S2-184096, Sanya, China, Apr. 16 -20, 2018, 5 pages.
Office Action issued in Chinese Application No. 201810490764.1 dated Jun. 3, 2020, 12 pages (with English translation).
PCT International Search Report and Written Opinion issued in International Application No. PCT/CN2019/083367 dated Jul. 10, 2019, 15 pages (with English translation).
Ericsson, "Interworking with Ethernet DN," 3GPP TSG-CT WG3 Meeting #96, C3-182382, Kunming, China, Apr. 16-20, 2018, 4 pages.
Extended European Search Report issued in European Application No. 19807452.8 dated Jun. 1, 2021, 14 pages.
Huawei et al., "The interaction between PCF and AF," 3GPP TSG-SA2 Meeting #127, S2-184171, Sanya, China, Apr. 16-20, 2018, 6 pages.
MediaTek Inc et al., "Miscellaneous editorial corrections (capitalization, messages, procedures etc.)," 3GPP TSG-SA2 Meeting #125, S2-181471, Gothenburg, Sweden, Jan. 21-26, 2018, 75 pages.
Nokia et al., "Controlled support of (AF) session binding for Ethernet PDU Session Type," SA WG2 Meeting #126, S2-182999, Montreal, Canada, Feb. 26-Mar. 2, 2018, 4 pages.
Office Action issued in Japanese Application No. 2020-565493 dated Feb. 1, 2022, 5 pages (with English translation).

* cited by examiner

600

Receive a notification message sent by a session management
function network element, where the notification message includes
MAC address information that is of a terminal device and that is
bound to a session and destination information, or the notification
message includes MAC address information that is of a terminal
device and that is bound to a session and first identification
information of a tunnel through which a user plane function network
element is connected to a gateway, and the destination information is
used by an application function network element to determine a
destination address to which downlink data is routed

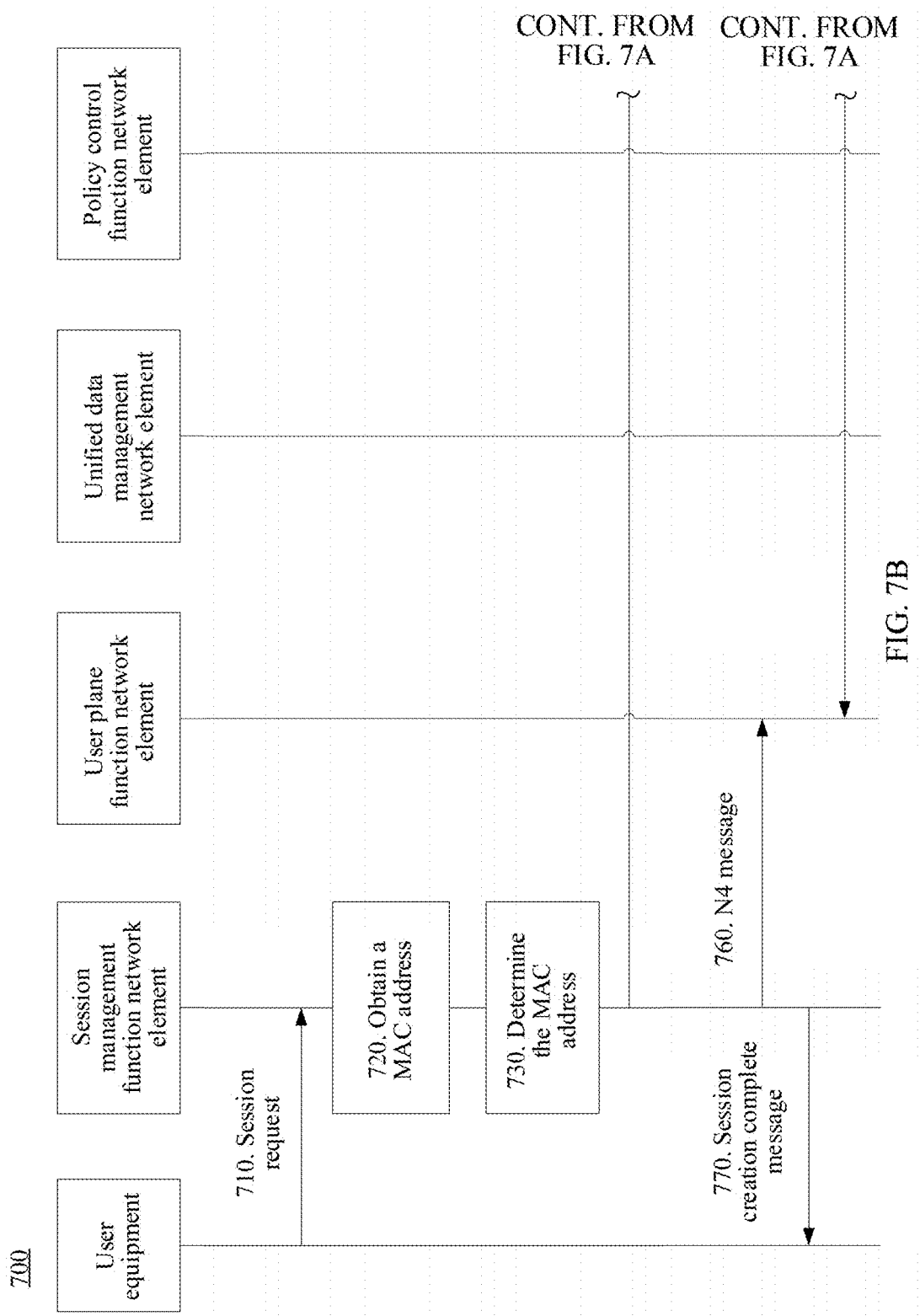

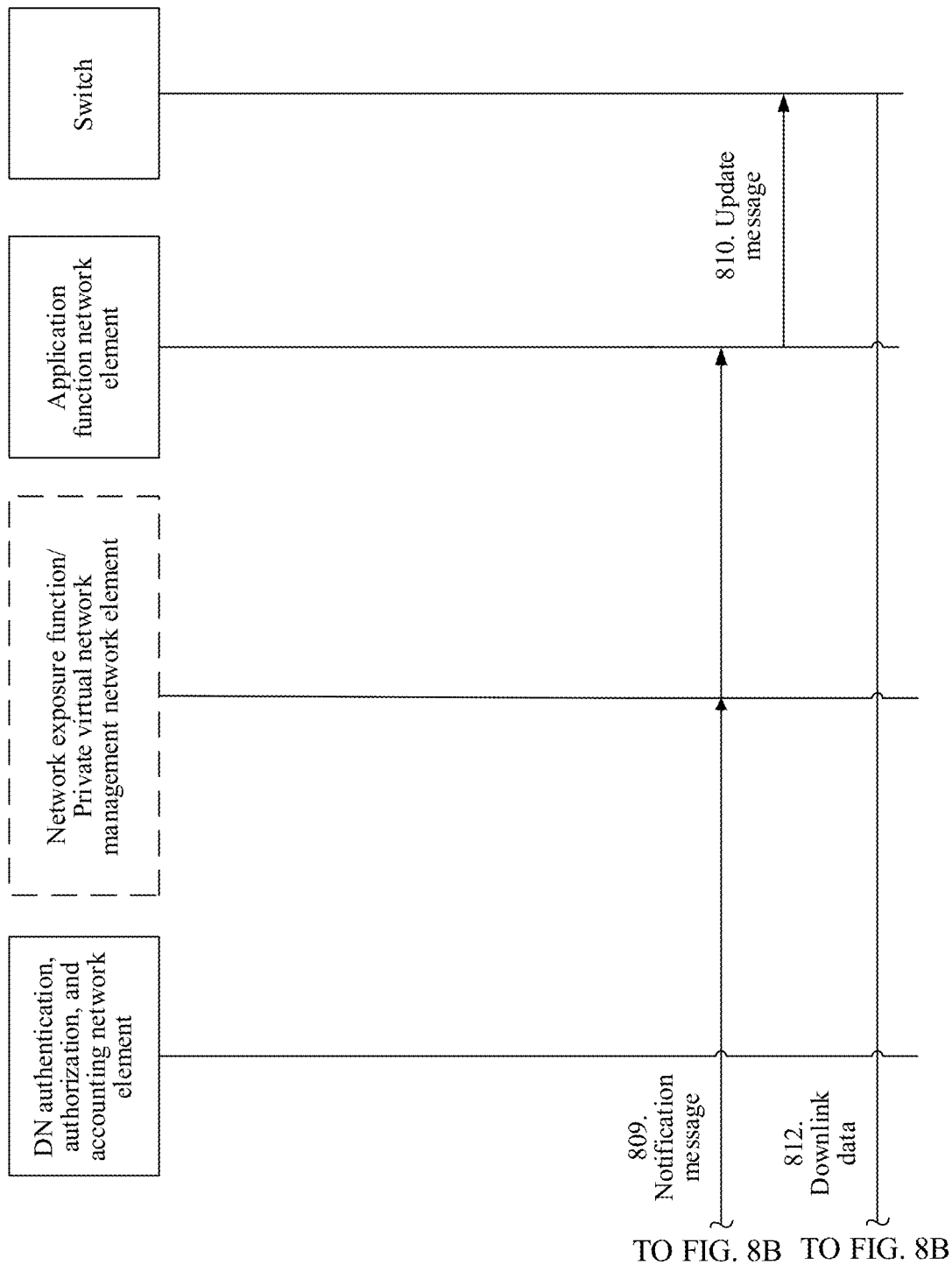

COMMUNICATION METHOD AND COMMUNICATIONS DEVICE

CROSS-REFERENCE TO RELATED APPLICATIONS

This application is a continuation of International Application No. PCT/CN2019/083367, filed on Apr. 19, 2019, which claims priority to Chinese Patent Application No. 201810490764.1, filed on May 21, 2018. The disclosures of the aforementioned applications are hereby incorporated herein by reference in its entirety.

TECHNICAL FIELD

This application relates to the communications field, and more specifically, to a communication method and a communications device.

BACKGROUND TECHNOLOGY

In a fifth generation mobile communications system (5th Generation), three types of sessions are supported: an IP session, an Ethernet session, and a non-structured session. For the three types of sessions, a switching network needs to provide a special transmission mechanism for transmitting a data packet between a user plane function network element (user plane function, UPF) of a carrier network and a data network (DN). For example, an IP data packet of an IP session may be transmitted by using an NAT/tunnel, and a non-structured data packet of a non-structured session may be transmitted by using a PtP tunnel. However, a mechanism for transmitting an Ethernet data packet of an Ethernet session is not defined, and the transmission mechanisms for the IP session and the non-structured session are inapplicable to the Ethernet session. Therefore, how to determine a transmission mechanism for transmitting an Ethernet data packet between the UPF and the DN is a problem that urgently needs to be resolved.

SUMMARY

This application provides a communication method and a communications device, to establish a transmission mechanism for transmitting an Ethernet data packet between a UPF and a DN, and resolve a problem of how to transmit an Ethernet data packet between the UPF and the DN.

According to a first aspect, a communication method is provided. The method is performed by a session management function network element, and includes: obtaining a media access control (MAC) address that is of a terminal device and that is bound to a session and first route information of an interface, corresponding to the session, between a user plane function network element and a data network; and sending, to an application function network element or a gateway of the data network, the MAC address that is of the terminal device and that is bound to the session and the first route information.

Therefore, the SMF obtains the media access control (MAC) address that is of the terminal device and that is bound to the session and the first route information of the interface, corresponding to the session, between the user plane function network element and the data network, and sends the obtained media access control (MAC) address that is of the terminal device and that is bound to the session and the obtained first route information to the application function network element or the gateway of the data network, so that the application function network element and the gateway of the data network determine a transmission path of downlink data from the data network to the UPF based on the first route information.

With reference to the first aspect, in some implementations of the first aspect, the obtaining a MAC address that is of a terminal device and that is bound to a session includes: obtaining a MAC address of a first terminal device, where the first terminal device is a terminal device requesting to create the session, or the first terminal device accesses the session by using a second terminal device, the second terminal requesting to create the session; and/or determining, based on session subscription data of the first terminal device sent by a unified data management network element, a plurality of MAC addresses that are of the terminal device and that are associated with the session; and/or determining, based on an authentication and authorization response sent by a DN authentication, authorization, and accounting server, a plurality of MAC addresses that are of the terminal device and that are associated with the session; and/or determining, based on session policy information sent by a policy control function network element, a plurality of MAC addresses that are of the terminal device and that are associated with the session.

With reference to the first aspect, in some implementations of the first aspect, the obtaining a MAC address of a first terminal device includes: obtaining the MAC address of the first terminal device based on a session creation request sent by the first terminal device or a session creation request sent by the second terminal device, where the session creation request sent by the second terminal device includes the MAC address of the first terminal device; or receiving an address update report sent by the user plane function network element, where the address update report includes the MAC address of the first terminal device.

With reference to the first aspect, in some implementations of the first aspect, the first route information of the N6 interface includes first identification information of a tunnel associated with the session or destination information, where the destination information is used to indicate a destination address to which downlink data is routed, and the first identification information of the tunnel associated with the session includes a first ID of the tunnel and/or an ID of a virtual circuit corresponding to the tunnel.

The destination information includes any one or more pieces of the following information: a data network access identifier, an ID of the user plane function network element, an address of the user plane function network element, a fully qualified domain name, an interface identifier, a virtual local area network identifier, and a routing profile identifier.

With reference to the first aspect, in some implementations of the first aspect, when a tunnel between the user plane function network element and the gateway is a node-based tunnel, the method further includes: obtaining the first route information before the session is created, where the first route information includes the first ID of the tunnel associated with the session; and when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

When the tunnel between the user plane function network element and the gateway is a session-based tunnel, the obtaining first route information of an N6 interface of the session includes: when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

With reference to the first aspect, in some implementations of the first aspect, when the first route information includes the first ID of the tunnel associated with the session, the method further includes: sending a tunnel creation message to the user plane function network element, where the tunnel creation message includes a gateway address of the data network and the first route information, or the tunnel creation message includes an identifier of the data network and the first route information.

With reference to the first aspect, in some implementations of the first aspect, when the first route information includes the first identification information of the tunnel associated with the session, the method further includes: receiving second route information that is of the interface, corresponding to the session, between the user plane function network element and the data network and that is sent by the gateway of the data network, where the second route information includes second identification information of the tunnel associated with the session, and the second identification information of the tunnel associated with the session includes a second ID of the tunnel and/or the ID of the virtual circuit corresponding to the tunnel.

According to a second aspect, a communication method is provided. The method is performed by a user plane function network element, and includes: receiving downlink data sent by a gateway of a data network; and mapping, based on first route information of an interface, corresponding to a session, between a user plane function network element and the data network, or a plurality of media access control (MAC) addresses that are of a terminal device and that are bound to a session and a destination MAC address of the downlink data, the downlink data to the session for transmission.

With reference to the second aspect, in some implementations of the second aspect, the method further includes: obtaining the media access control (MAC) address that is of the terminal device and that is bound to the session and the first route information.

With reference to the second aspect, in some implementations of the second aspect, the obtaining the MAC address that is of the terminal device and that is bound to the session includes: obtaining a MAC address of a first terminal device based on a data packet sent by the first terminal device, where the first terminal device is a terminal device requesting to create the session, or the first terminal device accesses the session by using a second terminal device, the second terminal requesting to create the session; and/or receiving a MAC address that is of the terminal device, that is associated with the session, and that is sent by a session management function network element.

With reference to the second aspect, in some implementations of the second aspect, the method further includes: sending, to the gateway of the data network, the media access control (MAC) address that is of the terminal device and that is bound to the session and the first route information.

With reference to the second aspect, in some implementations of the second aspect, the first route information includes first identification information of a tunnel associated with the session, and the first identification information of the tunnel associated with the session includes a first ID of the tunnel and/or an ID of a virtual circuit corresponding to the tunnel.

With reference to the second aspect, in some implementations of the second aspect, when a tunnel between the user plane function network element and the gateway is a node-based tunnel, the method further includes: obtaining the first route information before the session is created, where the first route information includes the first ID of the tunnel associated with the session; and when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

When the tunnel between the user plane function network element and the gateway is a session-based tunnel, the obtaining first route information includes: when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

With reference to the second aspect, in some implementations of the second aspect, the method further includes: receiving second route information that is of the interface, corresponding to the session, between the user plane function network element and the data network and that is sent by the gateway of the data network, where the second route information includes second identification information of the tunnel associated with the session, and the second identification information of the tunnel associated with the session includes a second ID of the tunnel and/or the ID of the virtual circuit corresponding to the tunnel.

According to a third aspect, a communication method is provided. The method is performed by a gateway of an Ethernet data network, and includes: receiving downlink data in the data network; and mapping, based on a destination media access control (MAC) address of the downlink data and first route information of an interface between a user plane function network element and the data network, the downlink data to a corresponding path for transmission to the user plane function network element, where the first route information includes a MAC address that is of a terminal device and that is bound to a session and tunnel information corresponding to the session, or the first route information includes a MAC address that is of a terminal device and that is bound to a session and information about a interface of a switch corresponding to the session.

With reference to the third aspect, in some implementations of the third aspect, the method further includes: obtaining the first route information.

With reference to the third aspect, in some implementations of the third aspect, when a tunnel through which the user plane function network element is connected to the gateway is a single node-based tunnel, the obtaining the first route information includes: receiving first identification information of the tunnel sent by a core network function network element; or receiving first identification information of the tunnel sent by a core network function network element, and associating the first identification information of the tunnel with second identification information of the tunnel, where the second identification information is identification information that is of the tunnel and that is assigned by the gateway.

With reference to the third aspect, in some implementations of the third aspect, the method further includes: receiving a creation message of the tunnel sent by a private virtual network PVN management network element, where the tunnel creation message includes destination information; assigning the second identification information of the tunnel based on the creation message, and associating the second identification information of the tunnel with the destination information; and sending the assigned second identification information of the tunnel to the core network function network element.

With reference to the third aspect, in some implementations of the third aspect, the method further includes: receiving a creation message of the tunnel sent by a private virtual network PVN management network element, where the tunnel creation message includes destination information and the first identification information of the tunnel.

With reference to the third aspect, in some implementations of the third aspect, when a tunnel through which the user plane function network element is connected to the gateway is a session-based tunnel, the obtaining first route information of an interface includes: receiving a notification message sent by a core network function network element, where the notification message includes the MAC address bound to the session and first identification information of the tunnel through which the user plane function network element is connected to the gateway; assigning second identification information of the tunnel based on the notification message; and associating the MAC address bound to the session with the first identification information of the tunnel through which the user plane function network element is connected to the gateway and the second identification information of the tunnel.

With reference to the third aspect, in some implementations of the third aspect, the method further includes: sending the assigned second identification information of the tunnel to the core network function network element.

With reference to the third aspect, in some implementations of the third aspect, when a tunnel through which the user plane function network element is connected to the gateway is a session-based tunnel, the obtaining the first route information includes: receiving a notification message sent by a core network function network element, where the notification message includes the MAC address bound to the session and first identification information of the tunnel through which the user plane function network element is connected to the gateway.

With reference to the third aspect, in some implementations of the third aspect, the first identification information of the tunnel includes a first ID of the tunnel and/or an identifier of a virtual circuit, and the virtual circuit is associated with the session; or the second identification information of the tunnel includes a second ID of the tunnel and/or an identifier of a virtual circuit, and the virtual circuit is associated with the session.

According to a fourth aspect, a communication method is provided. The method is performed by an application function network element, and includes: receiving a notification message sent by a session management function network element, where the notification message includes MAC address information that is of a terminal device and that is bound to a session and destination information, or the notification message includes MAC address information that is of a terminal device and that is bound to a session and first identification information of a tunnel through which a user plane function network element is connected to a gateway, and the destination information is used by the application function network element to determine a destination address to which downlink data is routed.

With reference to the fourth aspect, in some implementations of the fourth aspect, when the notification message includes the MAC address information that is of the terminal device and that is bound to the session and the destination information, the method further includes: determining, based on the destination information, a switch that needs to be passed through from a data network to the destination address and a next-hop interface of the switch; and sending an update message to the switch, where the update message includes the MAC address information that is of the terminal device and that is bound to the session and the next-hop interface of the switch.

With reference to the fourth aspect, in some implementations of the fourth aspect, the destination information includes any one or more pieces of the following information: a data network access identifier, an ID of the user plane function network element, an address of the user plane function network element, a fully qualified domain name, an interface identifier, a virtual local area network identifier, and a routing profile identifier.

With reference to the fourth aspect, in some implementations of the fourth aspect, when the notification message includes the MAC address information that is of the terminal device and that is bound to the session and the first identification information of the tunnel through which the user plane function network element is connected to the gateway of the data network, the method further includes: sending, to the gateway of the data network, the MAC address information that is of the terminal device and that is bound to the session and the first identification information of the tunnel through which the user plane function network element is connected to the gateway of the data network.

With reference to the fourth aspect, in some implementations of the fourth aspect, the first identification information of the tunnel includes a first ID of the tunnel and/or an identifier of a virtual circuit, and the virtual circuit is associated with the session.

According to a fifth aspect, a session management function network element is provided, including: an obtaining module, configured to obtain a media access control (MAC) address that is of a terminal device and that is bound to a session and first route information of an interface, corresponding to the session, between a user plane function network element and a data network; and a sending module, configured to send, to an application function network element or a gateway of the data network, the MAC address that is of the terminal device and that is bound to the session and the first route information.

With reference to the fifth aspect, in some implementations of the fifth aspect, the obtaining module is specifically configured to: obtain a MAC address of a first terminal device, where the first terminal device is a terminal device requesting to create the session, or the first terminal device accesses the session by using a second terminal device, the second terminal requesting to create the session; and/or determine, based on session subscription data of the first terminal device sent by a unified data management network element, a plurality of MAC addresses that are of the terminal device and that are associated with the session; and/or determine, based on an authentication and authorization response sent by a DN authentication, authorization, and accounting server, a plurality of MAC addresses that are of the terminal device and that are associated with the session; and/or determine, based on session policy information sent by a policy control function network element, a plurality of MAC addresses that are of the terminal device and that are associated with the session.

With reference to the fifth aspect, in some implementations of the fifth aspect, the obtaining module is specifically configured to: obtain the MAC address of the first terminal device based on a session creation request sent by the first terminal device or a session creation request sent by the second terminal device, where the session creation request sent by the second terminal device includes the MAC address of the first terminal device; or receive an address update report sent by the user plane function network element, where the address update report includes the MAC address of the first terminal device.

With reference to the fifth aspect, in some implementations of the fifth aspect, the first route information includes first identification information of a tunnel associated with the session or destination information, where the destination information is used to indicate a destination address to which downlink data is routed, and the first identification information of the tunnel associated with the session includes a first ID of the tunnel and/or an ID of a virtual circuit corresponding to the tunnel. The destination information includes any one or more pieces of the following information: a data network access identifier, an ID of the user plane function network element, an address of the user plane function network element, a fully qualified domain name, an interface identifier, a virtual local area network identifier, and a routing profile identifier.

With reference to the fifth aspect, in some implementations of the fifth aspect, when a tunnel between the user plane function network element and the gateway is a node-based tunnel, the obtaining module is further configured to: obtain the first route information before the session is created, where the first route information includes the first ID of the tunnel associated with the session; and when the session is being created, obtain the first route information and the media access control (MAC) address that is of the terminal device and that is bound to the session, where the first route information includes the first ID of the tunnel associated with the session and/or the ID of the virtual circuit corresponding to the tunnel. When the tunnel between the user plane function network element and the gateway is a session-based tunnel, the obtaining module is further configured to: when the session is being created, obtain the first route information and the media access control (MAC) address that is of the terminal device and that is bound to the session, where the first route information includes the first ID of the tunnel associated with the session and/or the ID of the virtual circuit corresponding to the tunnel.

With reference to the fifth aspect, in some implementations of the fifth aspect, when the first route information includes the first ID of the tunnel associated with the session, the sending module is further configured to: send a tunnel creation message to the user plane function network element, where the tunnel creation message includes a gateway address of the data network and the first route information, or the tunnel creation message includes an identifier of the data network and the first route information.

With reference to the fifth aspect, in some implementations of the fifth aspect, when the first route information includes the first identification information of the tunnel associated with the session, the session management function network element further includes: a receiving module, configured to receive second route information that is of the interface, corresponding to the session, between the user plane function network element and the data network and that is sent by the gateway of the data network, where the second route information includes second identification information of the tunnel associated with the session, and the second identification information of the tunnel associated with the session includes a second ID of the tunnel and/or the ID of the virtual circuit corresponding to the tunnel.

According to a sixth aspect, a user plane function network element is provided, including: a receiving module, configured to receive downlink data sent by a gateway of a data network; and a sending module, configured to map, based on first route information of an interface, corresponding to a session, between a user plane function network element and the data network, or a plurality of media access control (MAC) addresses that are of a terminal device and that are bound to a session and a destination MAC address of the downlink data, the downlink data to the session for transmission.

With reference to the sixth aspect, in some implementations of the sixth aspect, the user plane function network element further includes: an obtaining module, configured to obtain the media access control (MAC) address that is of the terminal device and that is bound to the session and the first route information.

With reference to the sixth aspect, in some implementations of the sixth aspect, the obtaining module is specifically configured to: obtain a MAC address of a first terminal device based on a data packet sent by the first terminal device, where the first terminal device is a terminal device requesting to create the session, or the first terminal device accesses the session by using a second terminal device, the second terminal requesting to create the session; and/or receive a MAC address that is of the terminal device, that is associated with the session, and that is sent by a session management function network element.

With reference to the sixth aspect, in some implementations of the sixth aspect, the sending module is further configured to: send, to the gateway of the data network, the media access control (MAC) address that is of the terminal device and that is bound to the session and the first route information.

With reference to the sixth aspect, in some implementations of the sixth aspect, the first route information includes first identification information of a tunnel associated with the session, and the first identification information of the tunnel associated with the session includes a first ID of the tunnel and/or an ID of a virtual circuit corresponding to the tunnel.

With reference to the sixth aspect, in some implementations of the sixth aspect, when a tunnel between the user plane function network element and the gateway is a node-based tunnel, the obtaining module is specifically configured to: obtain the first route information before the session is created, where the first route information includes the first ID of the tunnel associated with the session; and when the session is being created, obtain the first route information and the media access control (MAC) address that is of the terminal device and that is bound to the session, where the first route information includes the first ID of the tunnel associated with the session and/or the ID of the virtual circuit corresponding to the tunnel. When the tunnel between the user plane function network element and the gateway is a session-based tunnel, the obtaining module is specifically configured to: when the session is being created, obtain the first route information and the media access control (MAC) address that is of the terminal device and that is bound to the session, where the first route information includes the first ID of the tunnel associated with the session and/or the ID of the virtual circuit corresponding to the tunnel.

With reference to the sixth aspect, in some implementations of the sixth aspect, the user plane function network element further includes: a receiving module, configured to receive second route information that is of the interface, corresponding to the session, between the user plane function network element and the data network and that is sent by the gateway of the data network, where the second route information includes second identification information of the tunnel associated with the session, and the second identification information of the tunnel associated with the session includes a second ID of the tunnel and/or the ID of the virtual circuit corresponding to the tunnel.

According to a seventh aspect, a gateway of a data network is provided, including: a receiving module, configured to receive downlink data in the data network; and a sending module, configured to map, based on a destination media access control (MAC) address of the downlink data and first route information of an interface between a user plane function network element and the data network, the downlink data to a corresponding path for transmission to the user plane function network element, where the first route information includes a MAC address that is of a terminal device and that is bound to a session and tunnel information corresponding to the session, or the first route information includes a MAC address that is of a terminal device and that is bound to a session and information about a interface of a switch corresponding to the session.

With reference to the seventh aspect, in some implementations of the seventh aspect, the gateway further includes: an obtaining module, configured to obtain the first route information.

With reference to the seventh aspect, in some implementations of the seventh aspect, when a tunnel through which the user plane function network element is connected to the gateway is a single node-based tunnel, the obtaining module is specifically configured to: receive first identification information of the tunnel sent by a core network function network element; or receive first identification information of the tunnel sent by a core network function network element, and associate the first identification information of the tunnel with second identification information of the tunnel, where the second identification information is identification information that is of the tunnel and that is assigned by the gateway.

With reference to the seventh aspect, in some implementations of the seventh aspect, the receiving module is further configured to: receive a creation message of the tunnel sent by a private virtual network PVN management network element, where the tunnel creation message includes destination information; assign the second identification information of the tunnel based on the creation message, and associate the second identification information of the tunnel with the destination information; and send the assigned second identification information of the tunnel to the core network function network element.

With reference to the seventh aspect, in some implementations of the seventh aspect, the receiving module is further configured to: receive a creation message of the tunnel sent by a private virtual network PVN management network element, where the tunnel creation message includes destination information and the first identification information of the tunnel.

With reference to the seventh aspect, in some implementations of the seventh aspect, when a tunnel through which the user plane function network element is connected to the gateway is a session-based tunnel, the obtaining module is specifically configured to: receive a notification message sent by a core network function network element, where the notification message includes the MAC address bound to the session and first identification information of the tunnel through which the user plane function network element is connected to the gateway; assign second identification information of the tunnel based on the notification message; and associate the MAC address bound to the session with the first identification information of the tunnel through which the user plane function network element is connected to the gateway and the second identification information of the tunnel.

With reference to the seventh aspect, in some implementations of the seventh aspect, the receiving module is further configured to send the assigned second identification information of the tunnel to the core network function network element.

With reference to the seventh aspect, in some implementations of the seventh aspect, when a tunnel through which the user plane function network element is connected to the gateway is a session-based tunnel, the obtaining module is specifically configured to: receive a notification message sent by a core network function network element, where the notification message includes the MAC address bound to the session and first identification information of the tunnel through which the user plane function network element is connected to the gateway.

With reference to the seventh aspect, in some implementations of the seventh aspect, the first identification information of the tunnel includes a first ID of the tunnel and/or an identifier of a virtual circuit, and the virtual circuit is associated with the session; or the second identification information of the tunnel includes a second ID of the tunnel and/or an identifier of a virtual circuit, and the virtual circuit is associated with the session.

According to an eighth aspect, an application function network element is provided, including: a receiving module, configured to receive a notification message sent by a session management function network element, where the notification message includes MAC address information that is of a terminal device and that is bound to a session and destination information, or the notification message includes MAC address information that is of a terminal device and that is bound to a session and first identification information of a tunnel through which a user plane function network element is connected to a gateway, and the destination information is used by the application function network element to determine a destination address to which downlink data is routed.

With reference to the eighth aspect, in some implementations of the eighth aspect, when the notification message includes the MAC address information that is of the terminal device and that is bound to the session and the destination information, the application function network element further includes: a determining module, configured to determine, based on the destination information, a switch that needs to be passed through from a data network to the destination address and a next-hop interface of the switch; and a sending module, configured to send an update message to the switch, where the update message includes the MAC address information that is of the terminal device and that is bound to the session and the next-hop interface of the switch.

With reference to the eighth aspect, in some implementations of the eighth aspect, the destination information includes any one or more pieces of the following information: a data network access identifier, an ID of the user plane function network element, an address of the user plane function network element, a fully qualified domain name, an interface identifier, a virtual local area network identifier, and a routing profile identifier.

With reference to the eighth aspect, in some implementations of the eighth aspect, when the notification message includes the MAC address information that is of the terminal device and that is bound to the session and the first identification information of the tunnel through which the user plane function network element is connected to the gateway of the data network, the application function network element further includes: a sending module, configured to send, to the gateway of the data network, the MAC address information that is of the terminal device and that is bound to the session and the first identification information of the tunnel through which the user plane function network element is connected to the gateway of the data network.

With reference to the eighth aspect, in some implementations of the eighth aspect, the first identification information of the tunnel includes a first ID of the tunnel and/or an identifier of a virtual circuit, and the virtual circuit is associated with the session.

According to a ninth aspect, a session management function network element is provided, including at least one processor, a memory, and a transceiver. The memory is configured to store an instruction, the transceiver is used by the session management function network element to communicate with another device, and the stored instruction is directly or indirectly executed by the at least one processor, so that the session management function network element can perform the method according to the first aspect or any optional implementation of the first aspect.

According to a tenth aspect, a user plane function network element is provided, including at least one processor, a memory, and a transceiver. The memory is configured to store an instruction, the transceiver is used by the user plane function network element to communicate with another device, and the stored instruction is directly or indirectly executed by the at least one processor, so that the user plane function network element can perform the method according to the second aspect or any optional implementation of the second aspect.

According to an eleventh aspect, a gateway device is provided, including at least one processor, a memory, and a transceiver. The memory is configured to store an instruction, the transceiver is used by the gateway device to communicate with another device, and the stored instruction is directly or indirectly executed by the at least one processor, so that the gateway device can perform the method according to the third aspect or any optional implementation of the third aspect.

According to a twelfth aspect, an application function network element is provided, including at least one processor, a memory, and a transceiver. The memory is configured to store an instruction, the transceiver is used by the application function network element to communicate with another device, and the stored instruction is directly or indirectly executed by the at least one processor, so that the application function network element can perform the method according to the fourth aspect or any optional implementation of the fourth aspect.

According to a thirteenth aspect, a chip system is provided, including at least one processor. The at least one processor is configured to execute a stored instruction, so that a session management function network element can perform the method according to the first aspect or any optional implementation of the first aspect.

According to a fourteenth aspect, a chip system is provided, including at least one processor. The at least one processor is configured to execute a stored instruction, so that a user plane function network element can perform the method according to the second aspect or any optional implementation of the second aspect.

According to a fifteenth aspect, a chip system is provided, including at least one processor. The at least one processor is configured to execute a stored instruction, so that a gateway device can perform the method according to the third aspect or any optional implementation of the third aspect.

According to a sixteenth aspect, a chip system is provided, including at least one processor. The at least one processor is configured to execute a stored instruction, so that an application function network element can perform the method according to the fourth aspect or any optional implementation of the fourth aspect.

According to a seventeenth aspect, a computer program product is provided. The computer program product includes an instruction, and when the instruction is executed, a session management function network element can be enabled to perform the method according to the first aspect or any optional implementation of the first aspect.

According to an eighteenth aspect, a computer program product is provided. The computer program product includes an instruction, and when the instruction is executed, a user plane function network element can be enabled to perform the method according to the second aspect or any optional implementation of the second aspect.

According to a nineteenth aspect, a computer program product is provided. The computer program product includes an instruction, and when the instruction is executed, a gateway device can be enabled to perform the method according to the third aspect or any optional implementation of the third aspect.

According to a twentieth aspect, a computer program product is provided. The computer program product includes an instruction, and when the instruction is executed, an application function network element can be enabled to perform the method according to the fourth aspect or any optional implementation of the fourth aspect.

According to a twenty-first aspect, a computer storage medium is provided. The computer storage medium stores a program instruction, and when the instruction is executed, a session management function network element can perform the method according to the second aspect or any optional implementation of the second aspect.

According to a twenty-second aspect, a computer storage medium is provided. The computer storage medium stores a program instruction, and when the instruction is executed, a user plane function network element can perform the method according to the second aspect or any optional implementation of the second aspect.

According to a twenty-third aspect, a computer storage medium is provided. The computer storage medium stores a program instruction, and when the instruction is executed, a gateway device can perform the method according to the third aspect or any optional implementation of the third aspect.

According to a twenty-fourth aspect, a computer storage medium is provided. The computer storage medium stores a program instruction, and when the instruction is executed, an application function network element can perform the method according to the fourth aspect or any optional implementation of the fourth aspect.

According to a twenty-fifth aspect, a system is provided. The system includes the session management function network element according to the first aspect or any optional implementation of the first aspect; and/or the user plane function network element according to the second aspect or any optional implementation of the second aspect; and/or the gateway device according to the third aspect or any optional implementation of the third aspect; and/or the application function network element according to the fourth aspect or any optional implementation of the fourth aspect.

BRIEF DESCRIPTION OF DRAWINGS

FIG. 6 is a schematic flowchart of a communication method according to this application;

FIG. 7A and FIG. 7B are a schematic flowchart of a communication method according to this application;

FIG. 8A and FIG. 8B are a schematic flowchart of a communication method according to this application;

DESCRIPTION OF EMBODIMENTS

The following describes technical solutions in this application with reference to the accompanying drawings.

Figure 1:
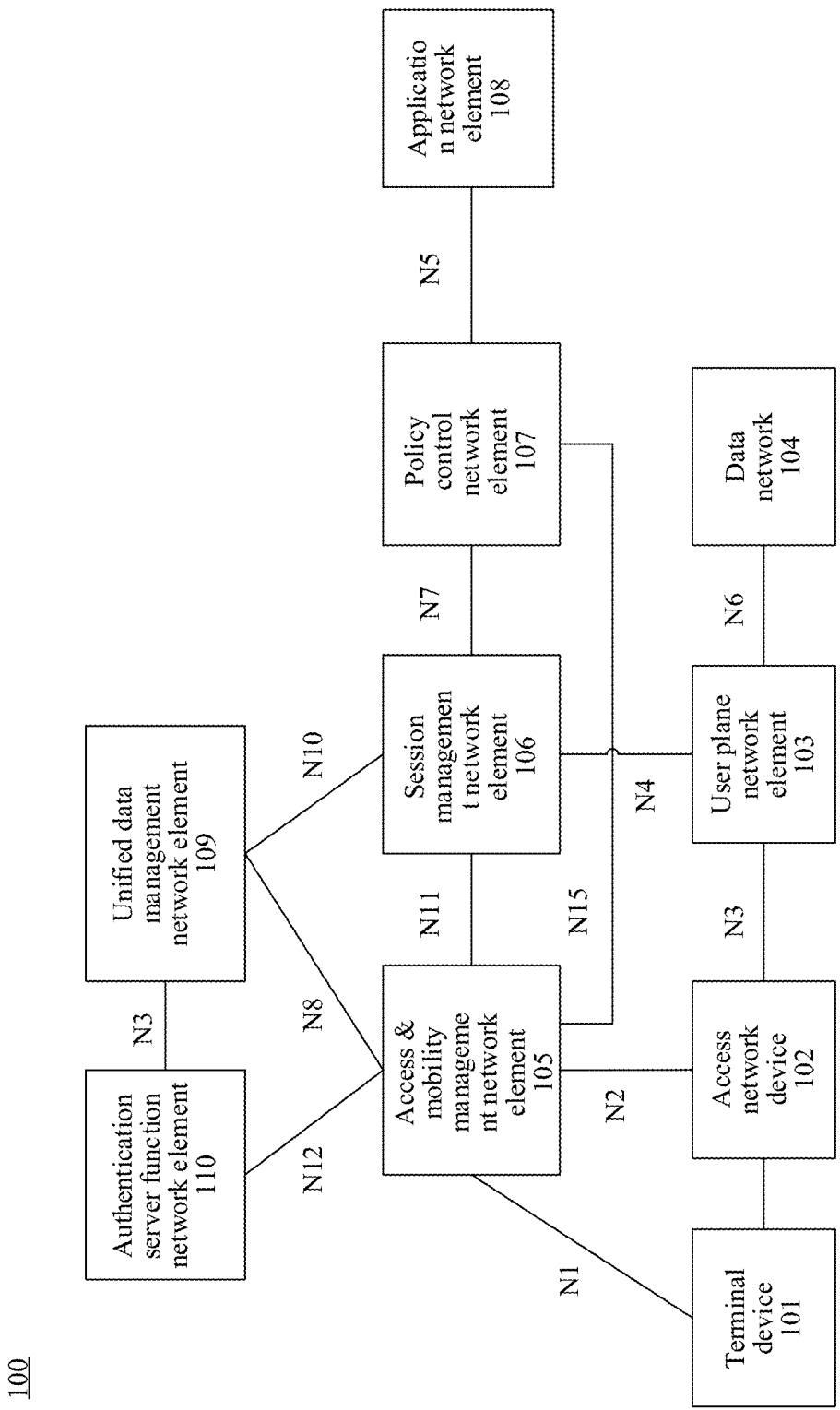
FIG. 1 is a schematic architectural block diagram of a communications system of a communication method and a communications device according to this application.

FIG. 1 is a schematic architectural block diagram of a communications system 100 of a communication method and a communications device according to this application. As shown in FIG. 1, the system 100 includes: a terminal device 101, an access network device 102, a user plane network element (user plane function, UPF) 103, a data network (DN) 104, an access & mobility management network element (access & mobility function, AMF) 105, a session management network element (session management function, SMF) 106, a policy control network element (policy control function, PCF) 107, an application network element (Application Function, AF) 108, a unified data management network element (unified data management, UDM) 109, and an authentication server function network element (Authentication Server Function, AUSF) 110. Network elements may establish a connection by using a next generation (NG) network interface, to implement communication. For example, the terminal device 101 establishes an air interface connection to the access network device 102 through a new radio (NR) interface, to transmit user plane data and control plane signaling; the terminal device 101 may establish a control plane signaling connection to the AMF through an NG interface 1 (N1 for short); the access network device 102 may establish a user plane data connection to the UPF through an NG interface 3 (N3 for short); the access network device 102 may establish a control plane signaling connection to the AMF through an NG interface 2 (N2 for short); the UPF may establish a control plane signaling connection to the SMF through an NG interface 4 (N4 for short); the UPF may exchange user plane data with the data network through an NG interface 6 (N6 for short); the AMF may establish a control plane signaling connection to the SMF through an NG interface 11 (N11 for short); the SMF may establish a control plane signaling connection to the PCF through an NG interface 7 (N7 for short); the PCF may establish a control plane signaling connection to the AF through an NG interface 5 (N5 for short); the PCF may establish a control plane signaling connection to the AF through an NG interface 15 (N15 for short); the UDM may establish a control plane signaling connection to the AMF through an NG interface 8 (N8 for short); and the UDM may establish a control plane signaling connection to the SMF through an NG interface 10 (N10 for short).

It should be understood that a name of an interface between network elements in this application is merely an example, and the interface between the network elements may have another name. The name of the interface is not limited in this application.

The communications system 100 shown in FIG. 1 includes a terminal device UE, an access network device AN, a core network core, and a data network. The UE, the AN, and the core are main components of the architecture, and may be logically divided into two parts: a user plane and a control plane. The control plane is responsible for mobile network management, and the user plane is responsible for service data transmission.

The terminal device 101 uses a next generation air interface technology to establish a signal connection and a data connection to the AN, so as to transmit a control signal and service data to a mobile network. The terminal device is an ingress for a mobile user to interact with a network, and can provide a basic computing capability and storage capability, display a service window to the user, and accept an operation input of the user.

The access network device 102 is similar to a base station in a conventional network and is deployed near the UE, provides a network access function for an authorized user in a particular area, and can transmit user data based on a user level, a service requirement, and the like through transmission tunnels of different quality. The AN can manage and properly use a resource of the AN, provide an access service for the UE as required, and forward a control signal and user data between the UE and the core network.

The core network core is responsible for maintaining subscription data of a mobile network, managing network elements in the mobile network, and providing functions such as session management, mobility management, policy management, and security authentication for the UE. When the UE is attached to the core network, the core network provides network access authentication for the UE; when the UE requests a service, the core network allocates network resources to the UE; when the UE moves, the core network update network resources for the UE; when the UE is idle, the core network provides a fast restoration mechanism for the UE; when the UE is detached from the core network, the core network releases network resources for the UE; when the UE has service data, the core network provides a data routing function for the UE, for example, forwards uplink data to a data network, or receives downlink data of the UE from the data network, and forwards the downlink data to the AN, to send the downlink data to the UE.

The user plane of the core network includes a user plane function UPF. The control plane of the core network includes an authentication server function AUSF, a core network access & mobility management function AMF, a session management function SMF, unified data management UDM, a policy control function PCF, and an application function AF.

The UPF is configured to: forward a data flow, control QoS, collect charging statistics, and so on. The AMF is configured to: perform access and mobility management of the terminal device, receive an access and mobility policy of the UE and a network selection policy that are provided by the PCF, and execute the policies. The SMF is configured to: perform a session and a service flow control policy that are provided by the PCF. The PCF may generate policy and charging control rules (PCC Rules) based on request information of the AF, an operator policy, user subscription information, and the like, to control a network behavior, and deliver the PCC rules to a control plane network element. The AF mainly provides a requirement of an application side on a network side, including a quality of service requirement of a service flow, a mobility requirement of user equipment, and the like. The UDM manages context information subscribed by the user equipment. The AUSF performs security authentication on the UE.

The DN 104 is a data network that provides a service for a user. Usually, a client is in the UE, and a serving end is in the data network. The data network may be a private network such as a local area network, or may be an external network that is not managed and controlled by an operator, or may be a dedicated network jointly deployed by operators, and may correspond to a plurality of different service domains, for example, an IP multimedia subsystem (IMS), the Internet, an internet protocol television (IPTV), and another operator service domain. The data network is mainly configured to provide a plurality of data services for a terminal device, and may include network devices such as a server, a router, and a gateway.

The terminal device may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in this embodiment of this application.

The access network device may be a device configured to communicate with the terminal device. The access network device may be a base transceiver station (BTS) in a global system for mobile communications (GSM) or code division multiple access (CDMA), may be a NodeB (NB) in a wideband code division multiple access (WCDMA) system, or may be an evolved NodeB (eNB or eNodeB) in an LTE system, or may be a radio controller in a cloud radio access network (CRAN) scenario, or the network device may be a relay station, an access point, a vehicle-mounted device, a wearable device, an access network (AN)/radio access network (RAN) device, or a network including a plurality of 5G-AN/5G-RAN nodes. The 5G-AN/5G-RAN node may be an access point (AP), a next-generation base station (NR nodeB, gNB), a central unit (CU), and a gNB in a separated form of a distributed unit (DU), a transmission receive point (TRP), a transmission point (TP), or another access node. This is not limited in this embodiment of this application.

Some of the foregoing network elements may work independently, or may be combined to implement some control functions. For example, the AMF, the SMF, and the PCF may be combined to serve as a management device, to implement access control and mobility management functions such as access authentication, security encryption, and location registration of the terminal device, session management functions such as user plane transmission path establishment, release, and change, and functions such as analysis of data (such as congestion) related to some slices and data related to the terminal device. As a gateway device, the UPF mainly implements functions such as user plane data routing and forwarding, for example, is responsible for filtering a data packet of the terminal device, transmitting/forwarding data, controlling a rate, and generating charging information.

A communication method provided in this application may be applied to a session management network element, a user plane function network element, a gateway of a data network, and an application function network element. The session management network element, the user plane function network element, the gateway of the data network, and the application function network element include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, such as the Linux operating system, the Unix operating system, the Android operating system, the iOS operating system, or the Windows operating system. The application layer includes applications such as a browser, a contact list, text processing software, and instant communication software.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to various media that can store, contain, and/or carry instructions and/or data.

The technical solutions of embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

FIG. 1 is merely a diagram of an example architecture, and is an example of a 5G architecture in the prior art. In addition to the functional units shown in FIG. 1, the network architecture may further include another functional unit or functional entity. This is not limited in this embodiment of the present disclosure In a 5th generation mobile communications system (5th Generation, fifth generation mobile communications system), three types of sessions may be supported: an IP session, an Ethernet session, and a non-structured session. The Ethernet session is a session used to transmit Ethernet-type PDU data, and corresponds to an IP-type PDU data transmitted in the IP session. When a 5G network supports the Ethernet session, one Ethernet session may be associated with a plurality of UE MAC addresses, and each Ethernet session may support a plurality of QoS flows. For example, UE may have a plurality of MAC addresses. An application 1 uses a MAC address 1, an application 2 uses a MAC address 2, and data corresponding to the application 1 and data corresponding to the application 2 may be transmitted on a same Ethernet session. In addition, an Ethernet network may have a limitation on accessing the 5G network by internal UE. The SMF may obtain, from DN-AAA server, a list of UE MAC addresses available for the Ethernet session. The UPF supports an ARP (Address Resolution Protocol) proxy function, filters out an invalid Ethernet packet according to a filtering rule configured by the SMF, and stores, based on a MAC address sent by the UE, the UE MAC address associated with the session.

An Ethernet DN means that a server or an application in a data network uses an Ethernet address to identify a communication peer end. Data transmission complies with an Ethernet technology standard formulated by the IEEE 802.3 standard, that is, currently, a most common local area network technology is used. The Ethernet DN includes the server, the application, and a switch connected to the server or the application. A globally unique 48-bit address, that is, a MAC address assigned by a manufacturer to a network adapter, is configured for each of the server, the application, and the switch, to ensure that all nodes on the Ethernet can identify each other.

Figure 2:
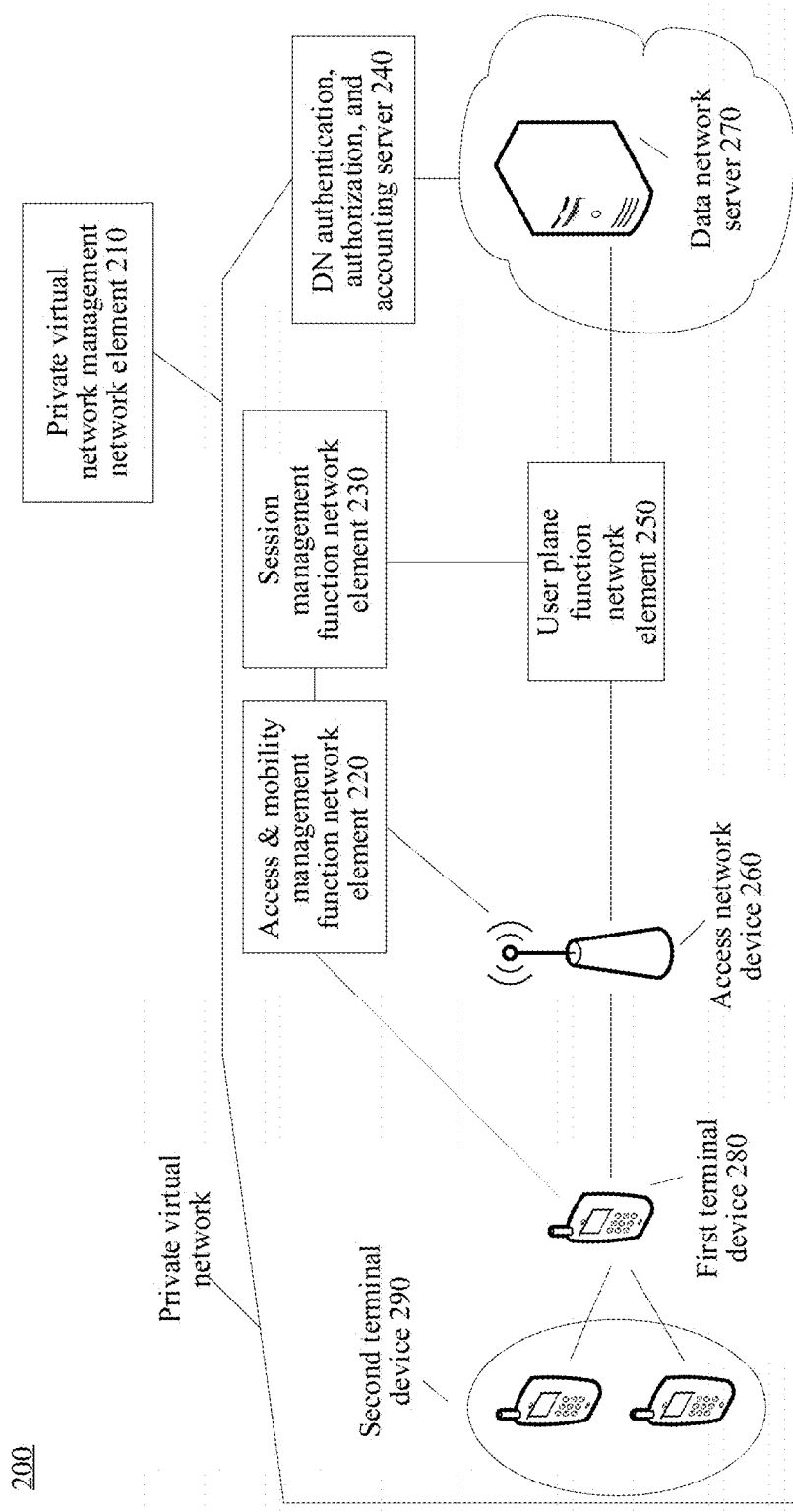
FIG. 2 is a schematic architectural diagram of a communications system architecture in which a 3GPP network is connected to an Ethernet in a 5G system.

FIG. 2 is an architectural diagram of a system 200 in which a 3GPP network is connected to an Ethernet in a 5G system. As shown in FIG. 2, the system 200 includes a private virtual network (PVN) manager network element 210, an AMF 220, an SMF 230, a DN-AAA 240, a UPF 250, an access network device 260, a data network server 270, a first terminal device 280, and a second terminal device 290. PVN is the abbreviation of private virtual network, and mainly provides a private communication service for a group of terminals. The PVN may isolate communication between different groups. To be specific, terminals in different groups cannot communicate with each other, and only terminals in a same group can communicate with each other. A network function required by the PVN may be provided by 3GPP networks located in a same slice, or may be provided by 3GPP networks located in different slices.

The 5G PVN manager network element is responsible for establishing a PVN for a tenant, configuring a network element in a network, activating a function of a network element, managing a user of the network, and setting a topology and a connection between network elements. The PVN is responsible for connection management and data transmission for users in a network. Network elements in the PVN include UE (relay UE or remote UE), an (R)AN, a UPF, an AMF, an SMF, and a DN. Optionally, if DN-AAA is deployed by an operator, the network elements in the PVN may further include a DN-AAA network element. The tenant may be an enterprise or a factory, and the tenant requires that an operator provides a private virtual network for the enterprise or the factory. The private virtual network may provide a group of terminals with servers, application access, and data communication with an Ethernet DN of an enterprise or a factory.

The private virtual network includes a terminal device in an enterprise or a factory. The terminal device can directly or indirectly communicate with a server in an Ethernet DN by using a carrier network. There may be two types of terminal devices based on access modes of the terminal devices: a relay terminal and a remote terminal. Terminal devices may have different hardware configurations, for example, a baseband chip and a Wi-Fi module are installed. If a terminal device can directly access a carrier network and can further provide Wi-Fi access for another type of terminal device, the terminal device is referred to as a relay terminal, for example, first UE in FIG. 2. If a terminal device is configured with only a Wi-Fi module, the terminal device needs to indirectly access a carrier network by accessing a relay UE, and this type of UE is referred to as a remote terminal, for example, second UE in FIG. 2.

The carrier network provides a communication service for the private virtual network, and needs special configurations, for example, subscription of UE and a requirement of a tenant in the private virtual network. During creation of an Ethernet session, the DN-AAA may provide a maximum of 16 MAC addresses available to the Ethernet session for the SMF. The SMF sets a UPF filtering rule, and the UPF discards, according to the filtering rule, UE data that does not include the available MAC addresses. The 16 MAC addresses available to the Ethernet session of the DN-AAA are configured by a tenant or an operator according to a requirement of the tenant, and are mainly used to prevent unauthorized UE from using a service provided by the private virtual network.

In the scenario shown in FIG. 2, a special transmission mechanism needs to be provided by a switching network for transmission of an Ethernet data packet between a UPF of the carrier network and an Ethernet DN. For example, an IP data packet of an IP session may be transmitted by using an NAT/tunnel, and a non-structured data packet of a non-structured session may be transmitted by using a PtP tunnel. However, a mechanism for transmitting the Ethernet data packet of the Ethernet session is not defined, and the transmission mechanisms for the IP session and the non-structured session are inapplicable to the Ethernet session. First, the NAT manner is IP address translation specially used for the IP session, and cannot be used for the Ethernet session. For the tunnel manner, for example, a tunnel of the IP session, tunnel information needs to include a UE IP address, and for a non-structured tunnel, tunnel information needs to include an IPv6 address. However, because a 5GC (5G Core) does not assign an IP address to the Ethernet session, the existing tunnel manner cannot be applicable to the Ethernet session, and an N6 connection is established for the Ethernet session to transmit the Ethernet data packet.

Based on the foregoing problem, this application provides a communication method. A session management function network element SMF or a user plane function network element UPF obtains a media access control (MAC) address that is of a terminal device and that is bound to a session and first route information of an interface, corresponding to the session, between the user plane function network element and a data network. The session management function network element SMF or the user plane function network element UPF sends, to a peer network element in a network, the MAC address that is of the terminal device and that is bound to the session and the first route information, so that a route is established between the peer network element in the network and the UPF, thereby resolving the problem of how to transmit an Ethernet data packet between the UPF and the DN.

Figure 3:
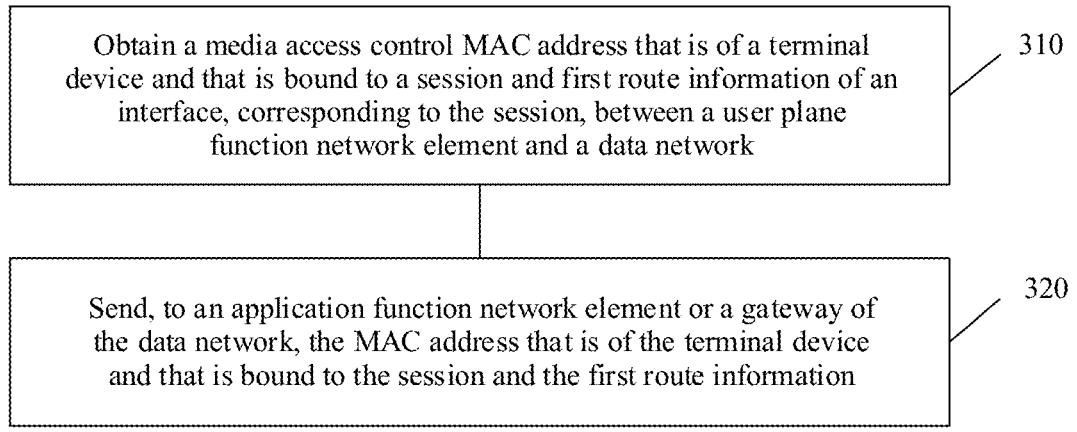
FIG. 3 is a schematic flowchart of a communication method according to this application.

A communication method provided in this application is described in detail below with reference to FIG. 3. FIG. 3 is a schematic flowchart of a communication method 300 according to an embodiment of this application. The method 300 may be applied to the scenario shown in FIG. 2, and certainly, may be applied to another communication scenario. This is not limited in this embodiment of this application.

As shown in FIG. 3, the method 300 includes the following content.

In 310, an SMF obtains a media access control (MAC) address that is of a terminal device and that is bound to a session and first route information of an interface, corresponding to the session, between a user plane function network element and a data network.

In 320, the SMF sends, to an application function network element or a gateway of the data network, the MAC address that is of the terminal device and that is bound to the session and the first route information.

Therefore, in this embodiment of this application, the SMF obtains the media access control (MAC) address that is of the terminal device and that is bound to the session and the first route information of the interface, corresponding to the session, between the user plane function network element and the data network, and sends the obtained media access control (MAC) address that is of the terminal device and that is bound to the session and the obtained first route information to the application function network element or the gateway of the data network, so that the application function network element and the gateway of the data network determine a transmission path of downlink data to the UPF based on the first route information.

Optionally, the obtaining a MAC address that is of a terminal device and that is bound to a session includes:

obtaining a MAC address of a first terminal device, where the first terminal device is a terminal device requesting to create the session, or the first terminal device accesses the session by using a second terminal device, the second terminal requesting to create the session; and/or determining, based on session subscription data of the first terminal device sent by a unified data management network element, a plurality of MAC addresses that are of the terminal device and that are associated with the session; and/or determining, based on an authentication and authorization response sent by a DN authentication, authorization, and accounting server, a plurality of MAC addresses that are of the terminal device and that are associated with the session; and/or determining, based on session policy information sent by a policy control function network element, a plurality of MAC addresses that are of the terminal device and that are associated with the session.

Specifically, the first terminal device needs to access the data network. The first terminal device may be the relay terminal shown in FIG. 2, or may be the remote terminal shown in FIG. 2. The remote terminal needs to access the network by using the relay terminal. Therefore, when the first terminal device is the remote terminal, the first terminal device needs to access the network by using the second terminal device. In this case, the second terminal device is the relay terminal.

The SMF may further obtain, from a network side, MAC address information associated with the session. The SMF may obtain, in one or more of the following three manners, the MAC address information associated with the session.

Manner 1: The SMF obtains the session subscription data of the terminal from the unified data management network element (UDM), where the subscription data includes UE MAC address information subscribed by the terminal for the session.

Manner 2: The SMF sends an authentication and authorization request to DN authentication, authorization, and accounting (DN-Authentication-Authorization-Accounting, DN-AAA), and receives an authentication and authorization response of the DN-AAA, where the authentication and authorization request message includes an SMF PDU DN request container, which provides authentication and authorization information of the UE for a particular DN identifier; and the SMF may receive the information from the UE, and provide the information for the DN-AAA. The authentication and authorization response message carries the UE MAC address information.

Manner 3: The SMF obtains the session policy information from the PCF, and may provide an identifier of the UE, for example, a GPSI or a 5G subscription permanent identifier (SUPI), where the session policy information includes associated UE MAC address information.

Optionally, the obtaining a MAC address of a first terminal device includes:

obtaining the MAC address of the first terminal device based on a session creation request sent by the first terminal device or a session creation request sent by the second terminal device, where the session creation request sent by the second terminal device includes the MAC address of the first terminal device; or receiving an address update report sent by the user plane function network element, where the address update report includes the MAC address of the first terminal device.

Specifically, when the first terminal device is a relay terminal, the first terminal device sends the session creation request to the SMF, where the session creation request includes the MAC address of the first terminal device; when the first terminal device is a remote terminal, because the remote terminal needs to access the network by using a relay terminal, the second terminal device (in this case, the second terminal device is the relay terminal) sends the session creation request to the SMF, where the session creation request includes the MAC address of the first terminal device.

Alternatively, the session creation request sent by the first terminal device or the second terminal device may not include the MAC address of the first terminal device. When the session creation request sent by the first terminal device or the second terminal device does not include the MAC address of the first terminal device, when the SMF receives the session creation request, the SMF obtains session policy information from the PCF. The session policy information may include an event filter, and the event filter is used to instruct the UPF to report a UE MAC address in a fake data packet to the SMF after the data packet is detected. Optionally, the session policy information includes a Target MAC address. The target MAC address is configured by an operator, and is a destination address of a fake data packet sent by the first terminal device after a session has been created. The event filter may also include the target MAC address.

The SMF sends a detection message to the UPF, and the detection message includes a session ID and the event filter. The event filter is used to instruct the UPF to report a UE MAC address in a data packet of the target MAC address to the SMF after the data packet is detected. Optionally, the detection message may further include the target MAC address.

The SMF sends a session complete message to the first terminal device (the first terminal device is a relay terminal). Optionally, the session complete message may carry indication information and the target MAC address, and the indication information is used to instruct the first terminal device to construct a fake data packet. If the session complete message carries the target MAC address, the first terminal device constructs the fake data packet based on the UE MAC address information and the target MAC address. Before sending actual uplink data, the first terminal device preferentially sends the constructed fake data packet to a network. If the SMF does not indicate the target MAC address to the first terminal device, the first terminal device may construct a fake Ethernet broadcast data packet, and the UPF detects the broadcast packet and provides MAC address information of the first terminal device for the SMF. Alternatively, for an Ethernet session, the first terminal device constructs and sends a fake packet to the UPF based on MAC address information of the first terminal device by default after a session has been created, and the SMF does not need to instruct, in the session complete message, the first terminal device to construct a fake data packet.

The UPF detects, based on the event filter, a data packet sent by the first terminal device; and if the event filter includes the target MAC address, detects a data packet that is of the first terminal device and that includes the target MAC address. The UPF obtains the detected MAC address of the first terminal device.

The UPF sends an N4 report to the SMF, where the N4 report includes the session ID and the MAC address information of the first terminal device.

The SMF determines, based on the MAC address information of the first terminal device included in the N4 report, MAC address information bound to the session.

It should be understood that because in the current 5G standards, a communications interface between the SMF and the UPF is an N4 interface, a message sent by the SMF to the UPF is referred to as an N4 message, and a message sent by the UPF to the SMF is referred to as an N4 report or an N4 message. For example, the address update report may also be referred to as an N4 report, and the detection message may be referred to as an N4 message. A name of the address update report and a name of the detection message are not limited in this application. In addition, the N4 message and the N4 report in this application do not constitute any limitation on the message.

It should be further understood that if the SMF obtains the MAC address of the first terminal device from the session creation request or the address update report, and in the session creation process, the SMF obtains, from the UDM, a UE MAC address associated with the session, or the SMF obtains, from the DN-AAA, a UE MAC address associated with the session, or the SMF obtains, from the PCF, a UE MAC address associated with the session, the SMF determines, based on the MAC address of the first terminal device and MAC address information that is associated with the session and that is obtained by the SMF, the MAC address information bound to the session. In other words, the SMF needs to determine whether the MAC address of the first terminal device is allowed to access the Ethernet data network through the Ethernet session.

Optionally, the first route information includes first identification information of a tunnel associated with the session or destination information, where the destination information is used to indicate a destination address to which downlink data is routed, and the first identification information of the tunnel associated with the session includes a first identifier (Identification, ID) of the tunnel and/or an ID of a virtual circuit corresponding to the tunnel.

The destination information includes any one or more pieces of the following information: a data network access identifier (DNAI), an identifier of the user plane function network element (UPF ID), an address of the user plane function network element (UPF Address), a fully qualified domain name (FQDN), an interface identifier (interface ID), a virtual local area network identifier VLAN ID, and a routing profile identifier (routing profile ID).

Specifically, data may be transmitted between the UPF and the DN by using a layer 2 network or a tunnel. There are two types of tunnels between the UPF and the DN: a node-based tunnel between the user plane function network element and the gateway, that is, a per node tunnel; and a session-based channel between the user plane function network element and the gateway, that is, a per session tunnel. The per node tunnel is a tunnel created between a UPF and a DN GW. The per session tunnel is a tunnel created between a session and a DN GW.

Optionally, the SMF sends a notification message to the AF, where the notification message includes UE MAC address information bound to an Ethernet session and the first route information, and the first route information includes destination information. The destination information includes the DNAI/UPF ID/UPF address/FQDN/interface ID/VLAN ID/routing profile ID and the like, and is used by the AF to determine the destination address to which the downlink data is routed.

Optionally, the notification message may be forwarded to the AF by using a network exposure function network element (Network Exposure Function, NEF)/PVN manager. After receiving the destination information, the NEF/PVN manager may map an identifier in the 3GPP network to an identifier in the DN, to hide a topology and user information in the 3GPP network. Information in the 3GPP network is converted into information available on a DN side. For example, the UPF ID/UPF address/interface ID and the like are mapped to the DNAI or the routing profile ID. The UPF ID, the UPF address, the interface ID, and the like are all identifiers in the 3GPP network, and have special formats. A value of the internal identifier is related to network deployment, and may be used to address or identify a network element in a carrier network. The DNAI and the routing profile ID are external identifiers. The DN or the AF may determine a route destination address by using the identifier, and the carrier network cannot identify the route destination address.

Optionally, when a tunnel between the user plane function network element and the gateway is a node-based tunnel, the method further includes:

obtaining the first route information before the session is created, where the first route information includes the first ID of the tunnel associated with the session; and when the session is being created, obtaining the first route information and the media access control (MAC) address that is of the terminal device and that is bound to the session, where the first route information includes the first ID of the tunnel associated with the session and/or the ID of the virtual circuit corresponding to the tunnel; and when the tunnel between the user plane function network element and the gateway is a session-based tunnel, the obtaining the first route information includes:

when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

Specifically, when the tunnel between the user plane function network element and the gateway is a node-based tunnel, before the session is created, that the SMF obtains the first route information includes that the SMF assigns the first ID of the tunnel or the SMF receives the first ID assigned by the UPF to the tunnel.

Before the session is created, a private virtual network management network element (Private Virtual Network Manager, PVN Manager) sends a tunnel creation (Create Tunnel) message to the SMF. The tunnel creation message may include parameters such as a DN ID, a tunnel type, and a UPF ID list, and the parameter tunnel type is an optional parameter. The tunnel type indicates that a type of a tunnel is GRE, LSP, or the like. The DN ID indicates a DN in which a DN GW is located. The UPF ID list indicates a UPF that needs to create a per node tunnel with the DN GW. Optionally, the tunnel creation message may be forwarded by a policy control function network element (Policy Control Function, PCF)/network exposure function network element (Network Exposure Function, NEF). After receiving the message, the PCF/NEF may distribute the message to a corresponding SMF based on the UPF ID list included in the tunnel creation message. The SMF assigns the first identification information of the tunnel based on the tunnel creation message, and associates the first identification information of the tunnel with a GW address.

It should be understood that, when the private virtual network management network element sends the tunnel creation create tunnel message to the SMF, if label distribution protocol (LDP)/multiprotocol border gateway protocol (MBGP) signaling interaction is supported between the SMF or the UPF and the DN GW, the tunnel creation message may include parameters such as the DN ID, the tunnel type, and the UPF ID list. If the LDP/MBGP signaling interaction is not supported between the SMF or the UPF and the DN GW, the tunnel creation create tunnel message sent by the private virtual network management network element to the SMF includes the first ID of the tunnel.

When the session is being created, the SMF obtains the first route information and the media access control (MAC) address that is of the terminal device and that is bound to the session, where the first route information includes the first ID of the tunnel associated with the session and/or the identifier of the virtual circuit corresponding to the tunnel. The identifier of the virtual circuit is optional, and the virtual circuit corresponds to the session.

When the tunnel between the user plane function network element and the gateway is a session-based tunnel, when the session is being created, the first route information and the media access control (MAC) address that is of the terminal device and that is bound to the session are obtained, where the first route information includes the first ID of the tunnel associated with the session and/or the ID of the virtual circuit corresponding to the tunnel.

Optionally, the method further includes: sending a tunnel creation message to the user plane function network element, where the tunnel creation message includes a gateway address of the data network and the first route information, or the tunnel creation message includes an identifier of the data network and the first route information.

Specifically, when the SMF sends the tunnel creation message to the UPF, and the tunnel creation message includes the gateway address of the data network and the first route information, the UPF updates a next hop label forwarding entry (NHLFE)/forwarding information table (FIB)/incoming label map (ILM) entry based on the received tunnel creation message.

When the tunnel creation message includes the identifier of the data network and the first route information, the UPF receives the DN ID, and the UPF determines the GW address based on the DN ID. The UPF assigns tunnel label information, associates the tunnel label information with the GW address, and associates the tunnel label information with the destination information.

Optionally, the tunnel creation message may further include type information of the tunnel. For example, the tunnel may be a generic routing encapsulation (GRE) tunnel, a label switched path (LSP) tunnel, or the like. The tunnel creation message may not include the type information of the tunnel, that is, the type of the tunnel may be preset in a system.

Optionally, the method further includes: receiving second route information that is of the interface, corresponding to the session, between the user plane function network element and the data network and that is sent by the gateway of the data network, where the second route information includes second identification information of the tunnel associated with the session, and the second identification information of the tunnel associated with the session includes a second ID of the tunnel and/or the ID of the virtual circuit corresponding to the tunnel.

Specifically, when the tunnel is a tunnel whose tunnel identifiers at both ends of the tunnel need to be synchronized, for example, the LSP tunnel, the SMF needs to receive the second route information that is of the interface, corresponding to the session, between the user plane function network element and the data network and that is sent by the gateway of the data network, where the second route information includes the second identification information of the tunnel associated with the session, and the second identification information of the tunnel associated with the session includes the second ID of the tunnel and/or the ID of the virtual circuit corresponding to the tunnel.

Figure 4:
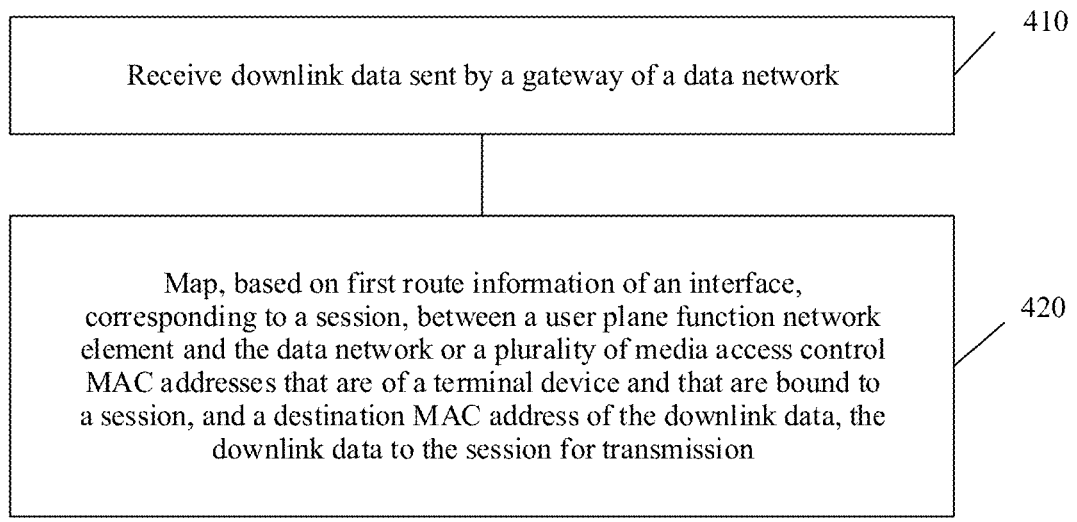
FIG. 4 is a schematic flowchart of a communication method according to this application.

FIG. 4 is a schematic flowchart of a communication method 400 according to an embodiment of this application. The method 400 may be applied to the scenario shown in FIG. 2, and certainly, may be applied to another communication scenario. This is not limited in this embodiment of this application.

As shown in FIG. 4, the method 400 includes the following content.

In 410, downlink data sent by a gateway of a data network is received.

In 420, the downlink data is mapped, based on first route information of an interface, corresponding to a session, between a user plane function network element and the data network, or a plurality of media access control (MAC) addresses that are of a terminal device and that are bound to a session and a destination MAC address of the downlink data, to the session for transmission.

Therefore, in this embodiment of this application, after receiving the downlink data sent by the gateway of the data network, the UPF maps, based on the first route information of the interface, corresponding to the session, between the user plane function network element and the data network or the plurality of media access control (MAC) addresses that are of the terminal device and that are bound to the session, and the destination MAC address of the downlink data, the downlink data to the session for transmission, thereby implementing router interworking between the gateway of the data network and the UPF.

Optionally, the method further includes: obtaining the media access control (MAC) address that is of the terminal device and that is bound to the session and the first route information.

Specifically, before receiving the downlink data sent by the gateway of the data network, the UPF needs to establish a data transmission path to the DN GW. Therefore, the UPF needs to obtain the media access control (MAC) address that is of the terminal device and that is bound to the session and the first route information.

Optionally, the obtaining the MAC address that is of the terminal device and that is bound to the session includes: obtaining a MAC address of a first terminal device based on a data packet sent by the first terminal device, where the first terminal device is a terminal device requesting to create the session, or the first terminal device accesses the session by using a second terminal device, the second terminal requesting to create the session; and/or receiving a MAC address that is of the terminal device, that is associated with the session, and that is sent by a session management function network element.

Specifically, after the session is created, the first terminal device sends a fake data packet to the UPF. The data packet carries the MAC address of the first terminal device.

It should be understood that for a specific process in which the UPF obtains the MAC address of the first terminal device based on the data packet sent by the first terminal device, refer to the corresponding description in the method 300. To avoid repetition, details are not described herein again.

Optionally, the method further includes: sending, to the gateway of the data network, the media access control (MAC) address that is of the terminal device and that is bound to the session and the first route information.

Optionally, the first route information includes first identification information of a tunnel associated with the session, and the first identification information of the tunnel associated with the session includes a first ID of the tunnel and/or an ID of a virtual circuit corresponding to the tunnel.

Optionally, when a tunnel between the user plane function network element and the gateway is a node-based tunnel, the method further includes:

obtaining the first route information before the session is created, where the first route information includes the first ID of the tunnel associated with the session; and when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

When the tunnel between the user plane function network element and the gateway is a session-based tunnel, the obtaining the first route information includes: when the session is being created, obtaining the first route information and the media access control (MAC) address that is of the terminal device and that is bound to the session, where the first route information includes the first ID of the tunnel associated with the session and/or the ID of the virtual circuit corresponding to the tunnel.

Specifically, when the tunnel between the user plane function network element and the gateway is a node-based tunnel, before the session is created, the UPF assigns the first ID of the tunnel.

Before the session is created, a private virtual network management network element (Private Virtual Network Manager, PVN Manager) sends a tunnel creation create tunnel message to the SMF. The tunnel creation message may include parameters such as a DN ID, a tunnel type, and a UPF ID list, and the parameter tunnel type is an optional parameter. The tunnel type indicates that a type of a tunnel is GRE, LSP, or the like. The DN ID indicates a DN in which a DN GW is located. The UPF ID list indicates a UPF that needs to create a per node tunnel with the DN GW. Optionally, the tunnel creation message may be forwarded by a policy control function network element (Policy Control Function, PCF)/network exposure function network element (Network Exposure Function, NEF). After receiving the message, the PCF/NEF may distribute the message to a corresponding SMF based on the UPF ID list included in the tunnel creation message. When receiving the tunnel creation message, the SMF sends the tunnel creation message to the UPF. If the SMF may determine a DN GW address based on the DN ID, the SMF may replace the DN ID with the DN GW address. If the UPF receives the DN ID, the UPF determines the GW address based on the DN ID. The UPF assigns tunnel label information, and associates the tunnel label information with the GW address.

Optionally, the tunnel creation message may further include type information of the tunnel. For example, the tunnel may be a GRE tunnel, an LSP tunnel, or the like. Alternatively, the tunnel message may not include the type information of the tunnel, that is, the type of the tunnel may be preset in a system.

When the session is being created, the UPF obtains the first route information and the media access control (MAC) address that is of the terminal device and that is bound to the session, where the first route information includes the first ID of the tunnel associated with the session and/or the identifier of the virtual circuit corresponding to the tunnel. The identifier of the virtual circuit is optional, and the virtual circuit corresponds to the session.

Optionally, the method further includes: receiving second route information that is of the interface, corresponding to the session, between the user plane function network element and the data network and that is sent by the gateway of the data network, where the second route information includes second identification information of the tunnel associated with the session, and the second identification information of the tunnel associated with the session includes a second ID of the tunnel and/or the ID of the virtual circuit corresponding to the tunnel.

Specifically, when the tunnel is a tunnel whose tunnel identifiers at both ends of the tunnel need to be synchronized, for example, the LSP tunnel, the UPF needs to receive the second route information that is of the interface, corresponding to the session, between the user plane function network element and the data network and that is sent by the gateway of the data network, where the second route information includes the second identification information of the tunnel associated with the session, and the second identification information of the tunnel associated with the session includes the second ID of the tunnel and/or the ID of the virtual circuit corresponding to the tunnel.

Figure 5:
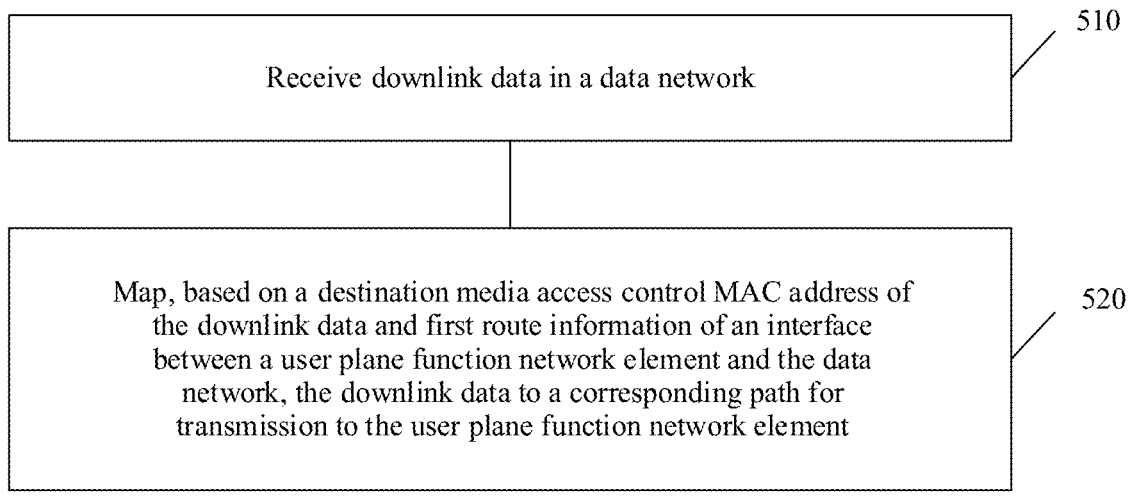
FIG. 5 is a schematic flowchart of a communication method according to this application.

FIG. 5 is a schematic flowchart of a communication method 500 according to an embodiment of this application. The method 500 may be applied to the scenario shown in FIG. 2, and certainly, may be applied to another communication scenario. This is not limited in this embodiment of this application.

As shown in FIG. 5, the method 500 includes the following content.

In 510, a gateway of a data network receives downlink data in the data network.

In 520, the gateway of the data network maps, based on a destination media access control (MAC) address of the downlink data and first route information of an interface between a user plane function network element and the data network, the downlink data to a corresponding path for transmission to the user plane function network element.

The first route information includes a MAC address that is of a terminal device and that is bound to a session and tunnel information corresponding to the session, or the first route information includes a MAC address that is of a terminal device and that is bound to a session and information about a interface of a switch corresponding to the session.

Optionally, the method further includes: obtaining the first route information.

Optionally, when a tunnel through which the user plane function network element is connected to the gateway is a single node-based tunnel, the obtaining the first route information includes: receiving first identification information of the tunnel sent by a core network function network element; or receiving first identification information of the tunnel sent by a core network function network element, and associating the first identification information of the tunnel with second identification information of the tunnel, where the second identification information is identification information that is of the tunnel and that is assigned by the gateway.

It should be understood that the core network function network element may be a UPF, or may be an SMF.

Optionally, the method further includes: receiving a creation message of the tunnel sent by a private virtual network PVN management network element, where the tunnel creation message includes destination information; assigning the second identification information of the tunnel based on the creation message, and associating the second identification information of the tunnel with the destination information; and sending the assigned second identification information of the tunnel to the core network function network element.

Optionally, the destination information includes any one or more pieces of the following information: a data network access identifier (DNAI), an identifier of the user plane function network element (UPF ID), an address of the user plane function network element (UPF Address), a fully qualified domain name (FQDN), an interface identifier interface ID, a virtual local area network identifier VLAN ID, and a routing profile identifier routing profile ID.

Optionally, the tunnel creation message may further include type information of the tunnel. For example, the tunnel may be a generic routing encapsulation (GRE) tunnel, a label switched path (LSP) tunnel, or the like. Alternatively, the tunnel message may not include the type information of the tunnel, that is, the type of the tunnel may be preset in a system.

Optionally, the method further includes: receiving a creation message of the tunnel sent by a private virtual network PVN management network element, where the tunnel creation message includes destination information and the first identification information of the tunnel.

Specifically, when the private virtual network management network element sends the tunnel creation create tunnel message to the DN GW, if LDP/MBGP signaling interaction is supported between the SMF or the UPF and the DN GW, the tunnel creation message may include the destination information. If the LDP/MBGP signaling interaction is not supported between the SMF or the UPF and the DN GW, the tunnel creation create tunnel message sent by the private virtual network management network element to the SMF includes the destination information and the first identification information of the tunnel.

Optionally, when a tunnel through which the user plane function network element is connected to the gateway is a session-based tunnel, the obtaining the first route information includes: receiving a notification message sent by the core network function network element, where the notification message includes the MAC address bound to the session and first identification information of the tunnel through which the user plane function network element is connected to the gateway;

assigning, by the DN GW, second identification information of the tunnel based on the notification message; and associating the MAC address bound to the session with the first identification information of the tunnel through which the user plane function network element is connected to the gateway and the second identification information of the tunnel.

Optionally, the method further includes: sending the assigned second identification information of the tunnel to the core network function network element.

Optionally, when a tunnel through which the user plane function network element is connected to the gateway is a session-based tunnel, the obtaining the first route information includes: receiving a notification message sent by the core network function network element, where the notification message includes the MAC address bound to the session and first identification information of the tunnel through which the user plane function network element is connected to the gateway.

Optionally, the first identification information of the tunnel includes a first ID of the tunnel and/or an identifier of a virtual circuit, and the virtual circuit is associated with the session; or the second identification information of the tunnel includes a second ID of the tunnel and/or an identifier of a virtual circuit, and the virtual circuit is associated with the session.

FIG. 6 is a schematic flowchart of a communication method 600 according to an embodiment of this application. The method 600 may be applied to the scenario shown in FIG. 2, and certainly, may be applied to another communication scenario. This is not limited in this embodiment of this application. The method 600 includes the following content.

In 610, an application function network element receives a notification message sent by a session management function network element, where the notification message includes MAC address information that is of a terminal device and that is bound to a session and destination information, or the notification message includes MAC address information that is of a terminal device and that is bound to a session and first identification information of a tunnel through which a user plane function network element is connected to a gateway, and the destination information is used by the application function network element to determine a destination address to which downlink data is routed.

Optionally, when the notification message includes the MAC address information that is of the terminal device and that is bound to the session and the destination information, the method further includes:

determining, based on the destination information, a switch that needs to be passed through from a data network to the destination address and a next-hop interface of the switch; and sending an update message to the switch, where the update message includes the MAC address information that is of the terminal device and that is bound to the session and the next-hop interface of the switch.

Specifically, the AF can determine, based on the destination information, a path from the DN to the destination address, a switch on the path, and a next-hop interface of each switch. The AF sends an update (Update) message to each switch (Switch), where the update message includes MAC address information bound to the session and a next-hop interface. After receiving the update message, the switch switch updates a MAC address table in the switch, and establishes, for the session, a route on an N6 interface between the DN and the UPF.

Optionally, the destination information includes any one or more pieces of the following information: a data network access identifier (DNAI), an identifier of the user plane function network element (UPF ID), an address of the user plane function network element (UPF Address), a fully qualified domain name (FQDN), an interface identifier interface ID, a virtual local area network identifier VLAN ID, and a routing profile identifier routing profile ID.

Optionally, when the notification message includes the MAC address information that is of the terminal device and that is bound to the session and the first identification information of the tunnel through which the user plane function network element is connected to the gateway of the data network, the method further includes:

sending, to the gateway of the data network, the MAC address information that is of the terminal device and that is bound to the session and the first identification information of the tunnel through which the user plane function network element is connected to the gateway of the data network.

Specifically, when LDP/MBLG signaling negotiation tunnel information is not supported between the UPF and the DN GW, the SMF needs to send, to the DN GW by using the AF, the MAC address information that is of the terminal device and that is bound to the session and the first identification information of the tunnel through which the user plane function network element is connected to the gateway.

To better understand this application, the following describes, with reference to specific embodiments, the communication method provided in the embodiments of this application.

Figure 7A:
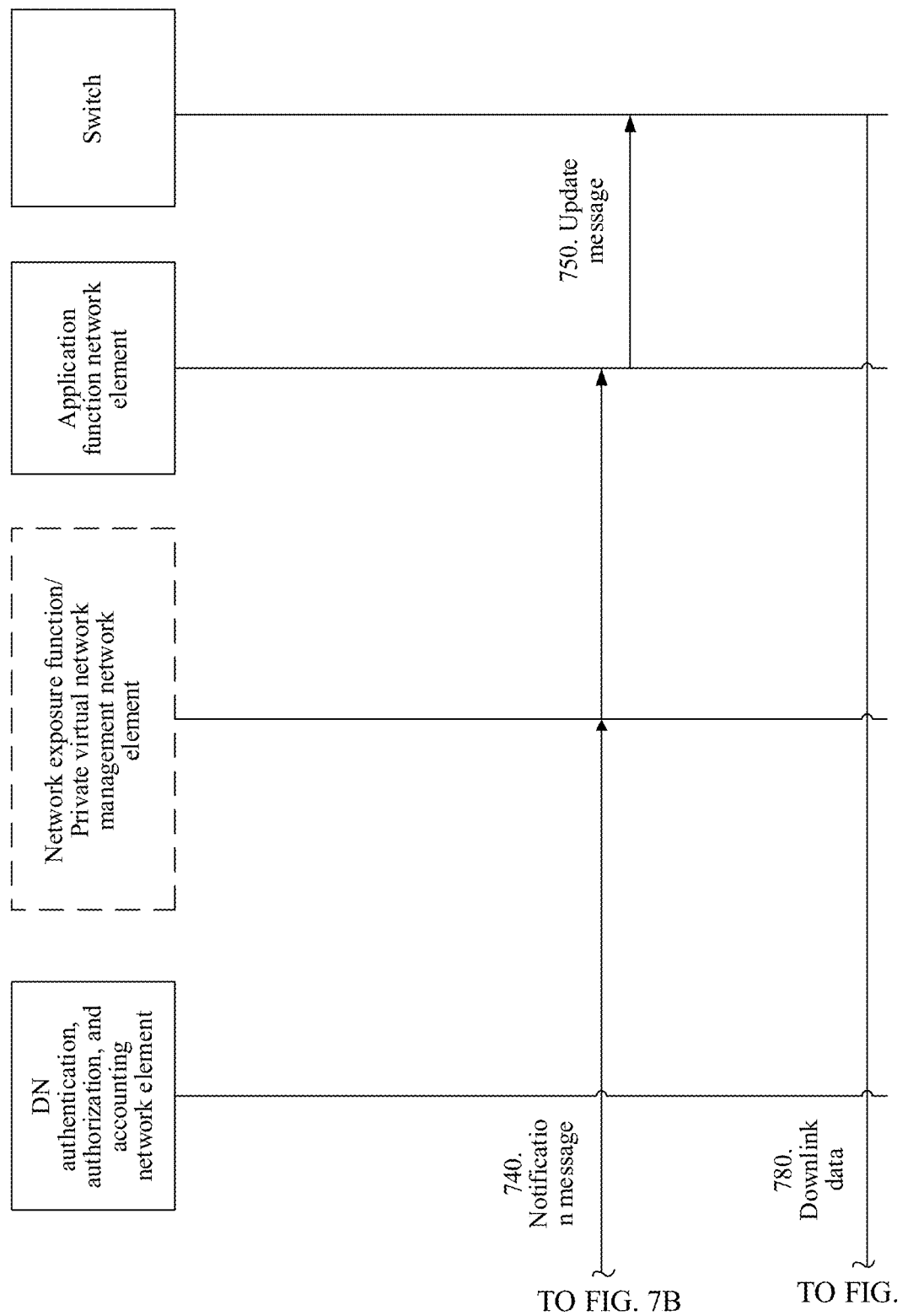

FIG. 7A and FIG. 7B are a schematic flowchart of a communication method 700 according to an embodiment of this application. The method 700 may be applied to the architecture shown in FIG. 2. The procedure shown in FIG. 7A and FIG. 7B mainly describes that an SMF obtains MAC address information bound to a session, and notifies a UPF of the MAC address information bound to the session. The SMF notifies an application function network element of the MAC address information bound to the session together with destination information determined by the UPF. The application function network element determines a path by using the destination information, that is, a switch on the path and a next-hop interface of each switch, updates a binding relationship between the MAC address bound to the session and the next-hop interface in the switch, so that an N6 route between the UPF and a DN is established. As shown in FIG. 7A and FIG. 7B, the method 700 includes the following content.

In 710, the SMF obtains a session creation request sent by UE. Optionally, the request carries address information of the UE (for example, a MAC address or a VID of the UE).

In 720, the SMF obtains, in one or more of the following three manners, MAC address information associated with the session: Manner 1: The SMF obtains session subscription data of a terminal from a UDM, where the subscription data includes subscribed UE MAC address information. Manner 2: The SMF sends an authentication and authorization request to DN-AAA, and receives an authentication and authorization response of the DN-AAA, where the authentication and authorization request message includes an SMF PDU DN request container, which provides authentication and authorization information of the UE for a particular DN identifier; and the SMF may receive the information from the UE, and provide the information for the DN-AAA. Optionally, the authentication and authorization request message may further carry a GPSI, and the authentication and authorization response message carries UE MAC address information. Manner 3: The SMF obtains session policy information from a PCF, and the SMF may provide a UE identifier, for example, a GPSI or an SUPI; and the PCF determines the session policy information, where the policy information includes associated UE MAC address information.

In 730, the SMF determines, based on the address information of the UE carried in the request and the MAC address information that is associated with the session and that is obtained by the SMF, MAC address information bound to the session, and selects a UPF.

In 740, the SMF sends a notification message to the AF, where the notification message includes UE MAC address information bound to an Ethernet session and destination information. The destination information includes a DNAI/UPF ID/UPF address/FQDN/interface ID/VLAN ID/routing profile ID and the like, and is used by the AF to determine a destination address to which downlink data is routed.

Optionally, the notification message may be forwarded to the AF by using a network exposure function network element (Network Exposure Function, NEF)/PVN manager. After receiving the destination information, the NEF/PVN manager may map an identifier in the 3GPP network to an identifier in the DN, to hide a topology and user information in the 3GPP network. Information in the 3GPP network is converted into information available on a DN side. For example, the UPF ID/UPF address/interface ID and the like are mapped to the DNAI or the routing profile ID. The UPF ID, the UPF address, the interface ID, and the like are all identifiers in the 3GPP network, and have special formats. A value of the internal identifier is related to network deployment, and may be used to address or identify a network element in a carrier network. The DNAI and the routing profile ID are external identifiers. The DN or the AF may determine a route destination address by using the identifier, and the carrier network cannot identify the route destination address.

In 750, the AF receives the notification message from the SMF. In this embodiment, the AF is an SDN controller, and the destination information includes information such as a DNAI/FQDN/VLAN ID/routing profile ID. The AF can determine a path from the DN to the destination address, a switch on the path, and a next-hop interface of each switch based on the destination information. The AF sends an update (Update) message to each switch (Switch), where the update message includes the MAC address information bound to the session and a next-hop interface. After receiving the update message, the switch switch updates a MAC address table in the switch, and establishes, for the session, a route on an N6 interface between the DN and the UPF.

In 760, the SMF sends an N4 message to the UPF, where the N4 message includes a session ID and the UE MAC address information bound to the session.

In 770, the SMF sends a session creation complete message to the UE.

In 780, the downlink data sent by a gateway of the DN is routed to the UPF based on destination UE MAC address in the downlink data by using the switch, and the UPF maps, based on destination MAC address information, the data to different sessions for transmission.

Therefore, in this embodiment of this application, the SMF obtains the MAC address information bound to the session, and notifies the UPF of the MAC address information bound to the session. The SMF notifies the application function network element of the MAC address information bound to the session together with the destination information determined by the UPF. The application function network element determines the path by using the destination information, that is, the switch on the path and the next-hop interface of each switch, updates the binding relationship between the MAC address bound to the session and the next-hop interface in the switch, so that the N6 route between the UPF and the DN is established.

Figure 8B:
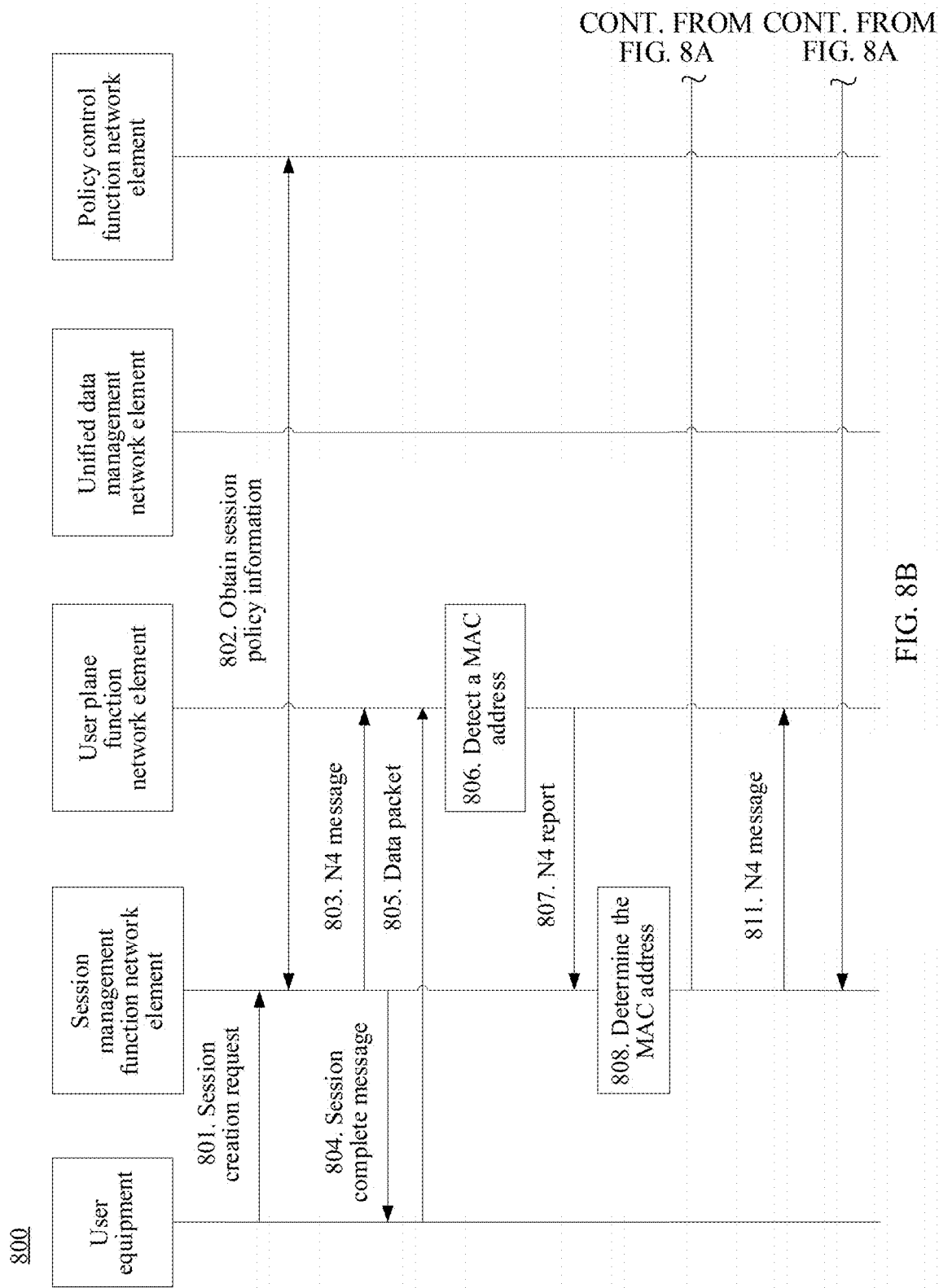

FIG. 8A and FIG. 8B are a schematic flowchart of a communication method 800 according to an embodiment of this application. The method 800 may be applied to the architecture shown in FIG. 2. The procedure shown in FIG. 8A and FIG. 8B mainly describes that an SMF may further determine, based on a MAC address of UE reported by a UPF, MAC address information bound to a session. As shown in FIG. 8A and FIG. 8B, the method 800 includes the following content.

In 801, the SMF obtains a session creation request sent by the UE.

In 802, the SMF obtains session policy information from a PCF, where the session policy information includes an event filter.

Optionally, the policy information includes a target MAC address. The target MAC address is configured by an operator, and is a destination address of a fake data packet sent by the UE after a session has been created. The event filter may also include the target MAC address.

In 803, the SMF sends an N4 message to the UPF, where the N4 message includes a session ID and an event filter. The event filter is used to instruct the UPF to report a UE MAC address in a data packet of the target MAC address to the SMF after the data packet is detected. Optionally, the N4 message may further include the target MAC address.

In 804, the SMF sends a session complete message to the UE. Optionally, the session complete message may carry an indication and the target MAC address, and the session complete message is used to instruct the UE to construct a fake data packet. If the session complete message carries the target MAC address, the UE constructs the fake data packet based on UE MAC address information and the target MAC address. Before sending actual uplink UL data, the UE preferentially sends the constructed fake data packet to a network. If the SMF does not indicate the target MAC address to the UE, the UE may construct a fake Ethernet broadcast packet, and the UPF detects the broadcast packet and provides the UE MAC address information for the SMF. Alternatively, for an Ethernet session, the UE constructs and sends a fake packet to the UPF based on the UE MAC address information by default after a session has been created, and the SMF does not need to instruct the UE in the session complete message.

It should be understood that in a process of creating the session, the SMF may further obtain, in one or more of the following three manners, MAC address information associated with the session: Manner 1: The SMF obtains session subscription data of a terminal from a UDM, where the subscription data includes subscribed UE MAC address information. Manner 2: The SMF sends an authentication and authorization request to DN-AAA, and receives an authentication and authorization response of the DN-AAA, where the authentication and authorization request message includes an SMF PDU DN request container, which provides authentication and authorization information of the UE for a particular DN identifier; and the SMF may receive the information from the UE, and provide the information for the DN-AAA. Optionally, the authentication and authorization request message may further carry a GPSI, and the authentication and authorization response message carries UE MAC address information. Manner 3: The SMF obtains session policy information from a PCF, and the SMF may provide a UE identifier, for example, a GPSI or an SUFI; and the PCF determines the session policy information, where the policy information includes associated UE MAC address information.

In 805, when the session has been created or when a new MAC address is detected, the UE constructs a fake Ethernet data packet and sends the fake Ethernet data packet to the network.

In 806, the UPF detects, based on the event filter, a data packet sent by the UE; and if the event filter includes the target MAC address, the UPF detects a data packet that is of the UE and that includes the target MAC address. The UPF obtains the detected UE MAC address.

In 807, the UPF sends an N4 report to the SMF, where the N4 report includes a session ID and the UE MAC address information, and the UE MAC address information is the UE MAC address information determined in 806.

In 808, the SMF determines, based on the UE MAC address information included in the N4 report, the MAC address information bound to the session.

It should be understood that in the session creation process, if the SMF obtains, from the UDM, UE MAC address information associated with the session, or the SMF obtains, from the DN-AAA, UE MAC address information associated with the session, or the SMF obtains, from the PCF, UE MAC address information associated with the session, the SMF determines, based on the N4 report and the MAC address information that is associated with the session and that is obtained by the SMF, the MAC address information bound to the session.

In 809, the SMF sends a notification message to an AF, where the notification message includes UE MAC address information bound to an Ethernet session and destination information. The destination information includes a DNAI/UPF ID/UPF address/FQDN/interface ID/VLAN ID/routing profile ID and the like, and is used by the AF to determine a destination address to which downlink data is routed.

Optionally, the notification message may be forwarded to the AF by using a network exposure function network element (Network Exposure Function, NEF)/PVN manager. After receiving the destination information, the NEF/PVN manager may map an identifier in the 3GPP network to an identifier in a DN, to hide a topology and user information in the 3GPP network. Information in the 3GPP network is converted into information available on a DN side. For example, the UPF ID/UPF address/interface ID and the like are mapped to the DNAI or the routing profile ID. The UPF ID, the UPF address, the interface ID, and the like are all identifiers in the 3GPP network, and have special formats. A value of the internal identifier is related to network deployment, and may be used to address or identify a network element in a carrier network. The DNAI and the routing profile ID are external identifiers. The DN or the AF may determine a route destination address by using the identifier, and the carrier network cannot identify the route destination address.

In 810, the AF receives the notification message from the SMF. In this embodiment, the AF is an SDN controller, and the destination information includes information such as a DNAI/FQDN/VLAN ID/routing profile ID. The AF can determine a path from the DN to the destination address, a switch on the path, and a next-hop interface of each switch based on the destination information. The SMF sends an update (Update) message to each switch (Switch), where the update message includes the MAC address information bound to the session and a next-hop interface. After receiving the update message, the switch switch updates a MAC address table in the switch, and establishes, for the session, a route on an N6 interface between the DN and the UPF.

In 811, the SMF sends an N4 message to the UPF, where the N4 message includes a session ID and the UE MAC address information bound to the session.

In 812, the downlink data sent by a gateway of the DN is routed to the UPF based on destination UE MAC address in the downlink data by using the switch, and the UPF maps, based on the destination MAC address information, the data to different sessions for transmission.

Therefore, in this embodiment of this application, the SMF obtains the MAC address information bound to the session, and notifies the UPF of the MAC address information bound to the session. The SMF notifies the application function network element of the MAC address information bound to the session together with the destination information determined by the UPF. The application function network element determines the path by using the destination information, that is, the switch on the path and the next-hop interface of each switch, updates the binding relationship between the MAC address bound to the session and the next-hop interface in the switch, so that an interface route between the UPF and the DN is established.

Figure 9A:
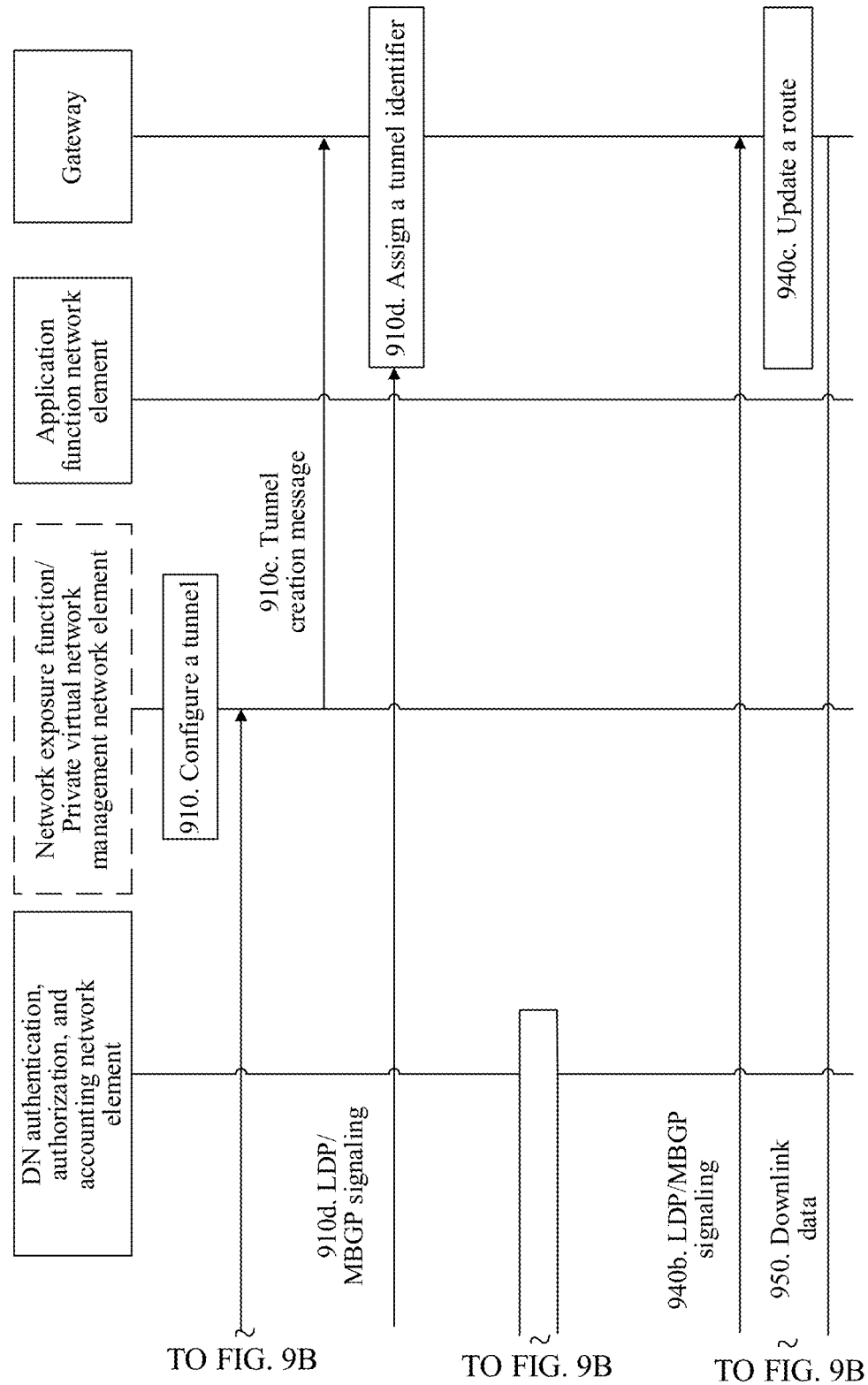
FIG. 9A and FIG. 9B are a schematic flowchart of a communication method according to this application.
Figure 9B:
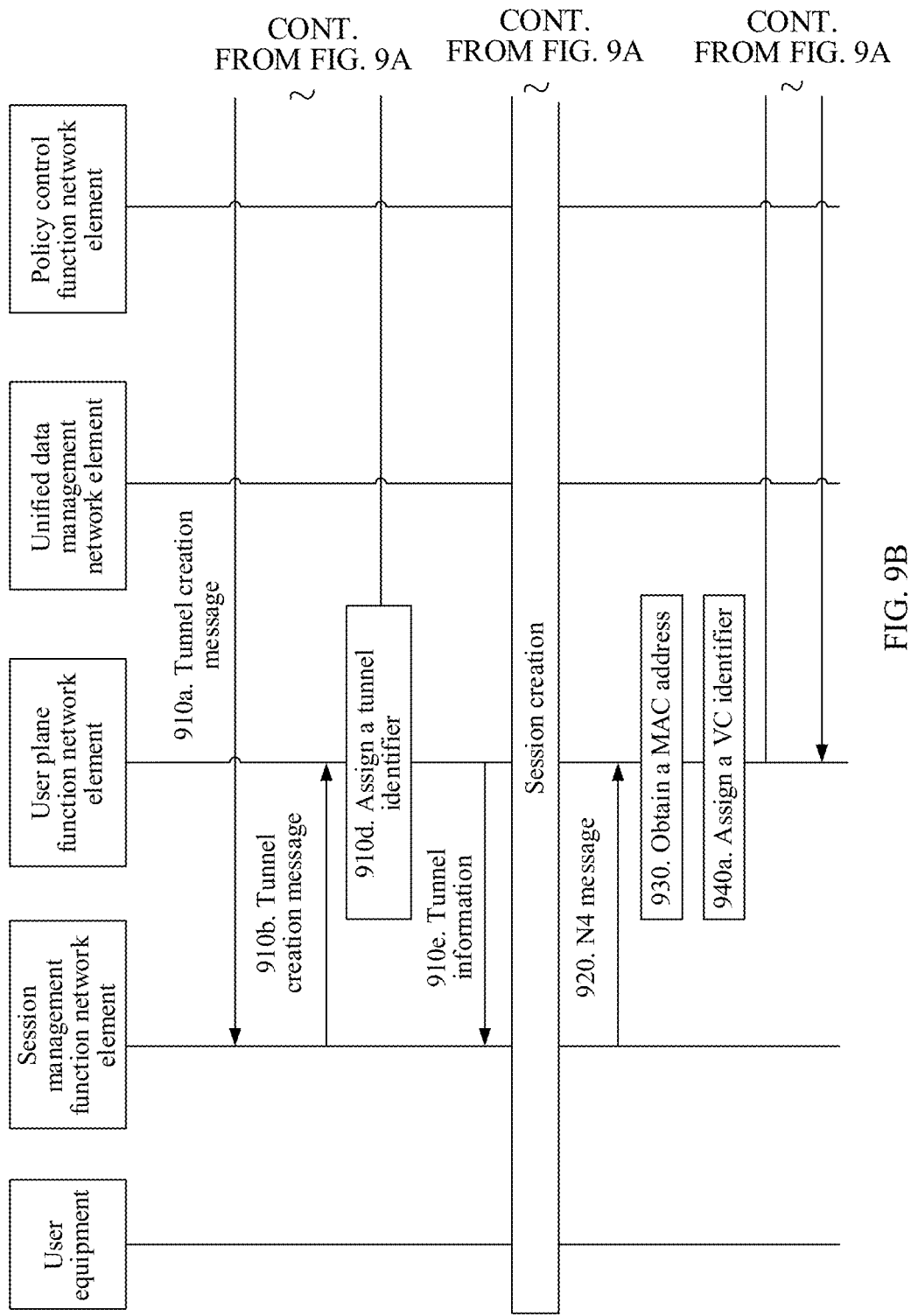

FIG. 9A and FIG. 9B are a schematic flowchart of a communication method 900 according to an embodiment of this application. The method 900 may be applied to the architecture shown in FIG. 2. A main difference between the procedure shown in FIG. 9A and FIG. 9B and the method 700 and the method 800 lies in that when constructing a PVN, a PVN manager instructs a DN GW and a UPF to create a per node tunnel, and when creating a session, the PVN manager updates a mapping relationship between a UE MAC address and a tunnel between the UPF and a DN by using LDP/MBGP signaling. As shown in FIG. 9A and FIG. 9B, the method 900 includes the following content.

In 910, when constructing the PVN, the PVN manager configures the per node tunnel from the DN GW (Switch/Router) to the UPF based on a topology structure of the PVN, and the tunnel may be a GRE tunnel or an LSP tunnel.

In 910*a*, the PVN manager sends a tunnel creation create tunnel message to an SMF. The tunnel creation message may include parameters such as a DN ID, a tunnel type, and a UPF ID list, and the parameter tunnel type is an optional parameter. The tunnel type indicates that a type of a tunnel is GRE, LSP, or the like. The DN ID indicates the DN in which the DN GW is located. The UPF ID list indicates the UPF that needs to create the per node tunnel with the DN GW.

Optionally, the tunnel creation message may be forwarded by a PCF/an NEF. After receiving the message, the PCF/NEF may distribute the message to a corresponding SMF based on the UPF ID list included in the tunnel creation message.

In 910*b*, the SMF sends a tunnel creation message (Create Tunnel) to the UPF, where the create tunnel message includes the DN ID and the tunnel type, or the create tunnel message includes a DN GW address and the tunnel type. The DN ID and the tunnel type are indicated by the PVN manager, and the UPF to which the tunnel creation message is sent is indicated by a UPF ID on the UPF ID list. If the SMF can determine the DN GW address based on the DN ID, the SMF may replace the DN ID with the DN GW address.

In 910*c*, the PVN manager sends a tunnel creation message (Create Tunnel) to the DN GW, where the tunnel creation message may include destination information and the tunnel type, and the destination information is a DNAI/FQDN/VLAN ID/routing profile ID or the like. The parameter tunnel type is optional, and the tunnel type is used to indicate that a type of the tunnel is GRE, LSP, or the like. Optionally, the tunnel creation message may be forwarded to the DN GW through an AF.

In 910*d*, if the UPF receives the DN ID, the UPF determines the GW address based on the DN ID. The UPF assigns tunnel label information, associates the tunnel label information with the GW address, and associates the tunnel label information with the destination information. The DN GW and the UPF exchange the assigned tunnel label information by using LDP/MBGP signaling, update respective next hop label forwarding entries (next hop label forwarding entry, NHLFE)/forwarding information tables (forwarding information table, FIB)/incoming label map (ILM) entries, so that the per node tunnel is created.

In 910*e*, optionally, the UPF notifies the SMF of tunnel information. The tunnel information is tunnel label information determined in 910*d*.

It should be understood that 910e is an optional step. The UPF notifies the SMF of the tunnel information, and the SMF may manage the tunnel label information.

In 920, when the session is being created, the SMF obtains a session data network name (DNN), and sends an N4 message to the UPF, where the N4 message includes a session ID, a DNN, or tunnel information.

It should be understood that if the SMF can obtain the tunnel information based on the DNN (DN ID), the tunnel information may be carried; If the SMF cannot obtain the tunnel information based on the DNN, the DNN is carried.

In 930, the UPF obtains UE MAC address information bound to the session.

For a specific procedure in which the UPF obtains the UE MAC address information bound to the session, refer to related descriptions in the method 700 and the method 800. To avoid repetition, details are not described herein again.

In 940a, the UPF assigns a VC label, and associates the VC label with a MAC address bound to the session. It should be understood that 940a is an optional step.

In 940b, the UPF and the DN GW synchronize information by using LDP/MBGP signaling, where the synchronized information includes the VC label, the tunnel label, and the UE MAC address information that is bound to the session. The VC label is optional. When assigning the VC label, the UPF associates the VC label with the MAC address bound to the session, and adds the VC label to the synchronized information.

In 940c, the DN GW receives MAC address information (and VC label information) bound to the session, and updates a route to the UPF.

In 950, the DN GW maps DL data to a tunnel label (and a VC label) of a per node tunnel based on a destination MAC address of the DL data, adds the labels to the downlink data, and transmits the downlink data to the UPF through the tunnel. The UPF maps the data to different sessions based on the destination MAC address. If the VC label is carried, the data may be mapped to different sessions based on the VC label.

Therefore, in this embodiment of this application, when constructing the PVN, the PVN manager instructs the DN GW and the UPF to create the per node tunnel. When the session is being created, the PVN manager updates the mapping relationship between the UE MAC address and the tunnel between the UPF and the DN by using the LDP/MBGP signaling, to establish an interface route between the UPF and the DN.

Figure 10A:
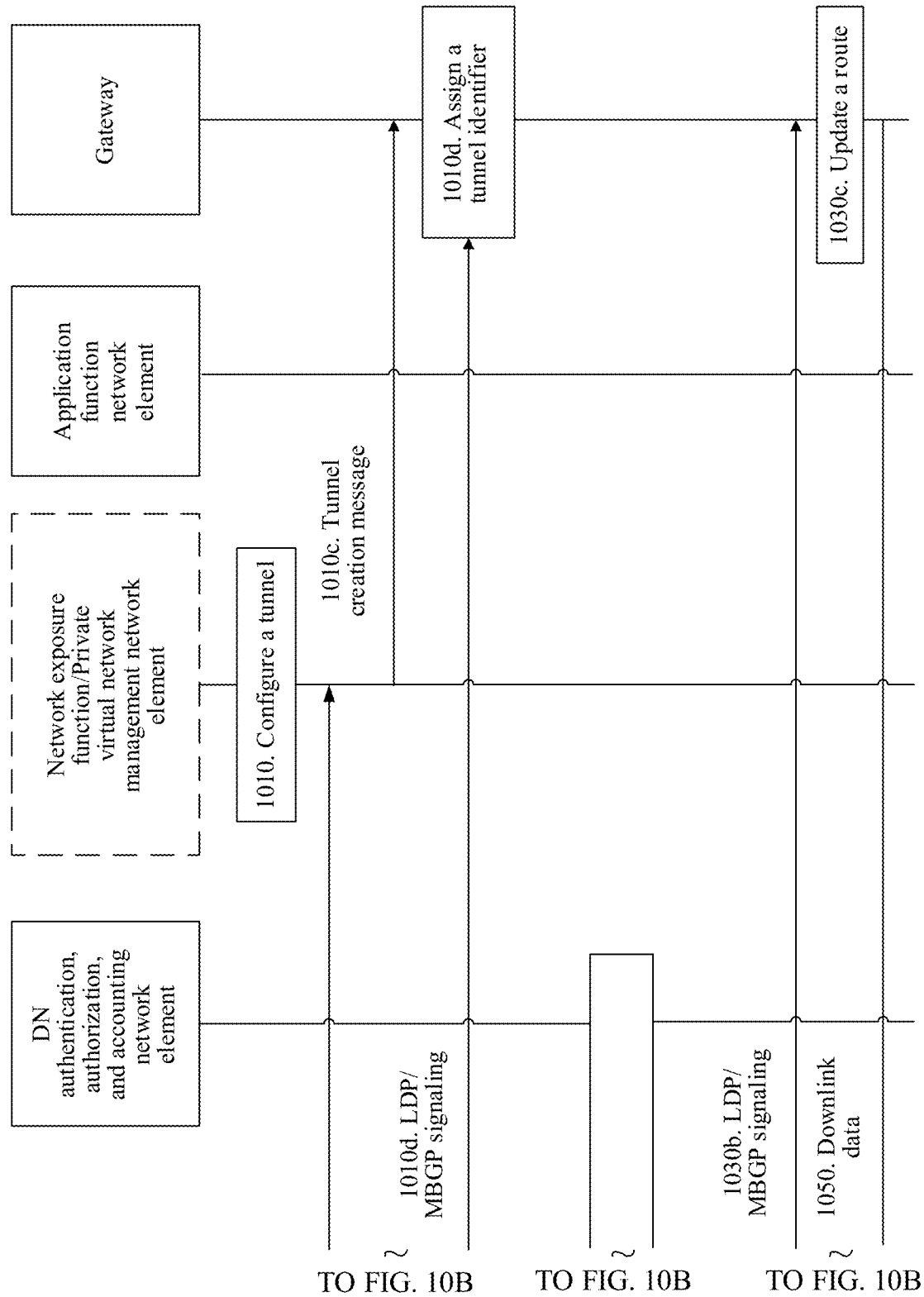
FIG. 10A and FIG. 10B are a schematic flowchart of a communication method according to this application.
Figure 10B:
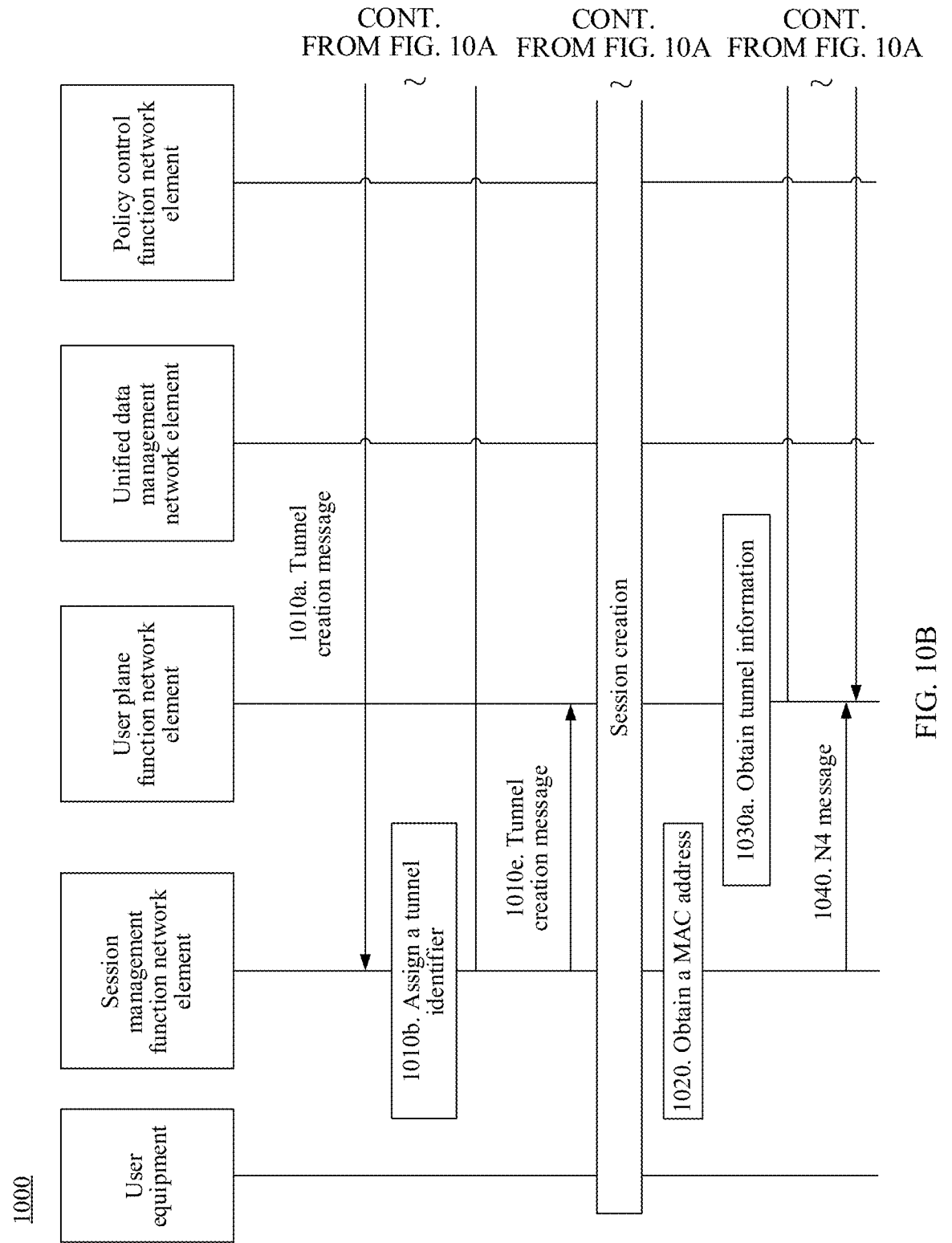

FIG. 10A and FIG. 10B are a schematic flowchart of a communication method 1000 according to an embodiment of this application. The method 1000 may be applied to the architecture shown in FIG. 2. A main difference between the procedure shown in FIG. 10A and FIG. 10B and the method 900 lies in that when constructing a PVN, a PVN manager instructs a DN GW and an SMF to create a per node tunnel, and when a session is being created, a mapping relationship between a UE MAC address and a tunnel is updated between the SMF and a DN, the SMF sends configured tunnel identifier information to a UPF, and the UPF assigns a tunnel identifier based on the tunnel identifier information sent by the SMF. As shown in FIG. 10A and FIG. 10B, the method 1000 includes the following content.

In 1010, when constructing the PVN, the PVN manager configures the per node tunnel from the DN GW (Switch/Router) to the UPF based on a topology structure of the PVN, and the tunnel may be a GRE tunnel or an LSP tunnel.

In 1010a, the PVN manager sends a tunnel creation message (Create Tunnel) to the SMF. The tunnel creation message may include parameters such as a DN ID, a tunnel type, and a UPF ID list, and the parameter tunnel type is an optional parameter. The tunnel type indicates that a type of a tunnel is GRE, LSP, or the like. The DN ID indicates the DN in which the DN GW is located. The UPF ID list indicates the UPF that needs to create the per node tunnel with the DN GW.

Optionally, the tunnel creation message may be forwarded by a PCF/an NEF. After receiving the message, the PCF/NEF may distribute the message to a corresponding SMF based on the UPF ID list included in the tunnel creation message.

In 1010b, the SMF determines a GW address based on the DN ID. The SMF assigns tunnel label information, and associates the tunnel label information with the GW address.

In 1010c, the PVN manager sends a tunnel creation message (Create Tunnel) to the DN GW, where the tunnel creation message may include destination information and the tunnel type, and the destination information is a DNAI/FQDN/VLAN ID/routing profile ID or the like. The parameter tunnel type is optional, and the tunnel type is used to indicate that a type of the tunnel is GRE, LSP, or the like. Optionally, the tunnel creation message may be forwarded to the DN GW through an AF.

In 1010d, the DN GW assigns the tunnel label information, and associates the tunnel label information with the destination information; and the DN GW and the SMF exchange the assigned tunnel label information by using LDP/MBGP signaling, and update respective NHLFE/FIB/ILM entries, where the LDP/MBGP signaling is forwarded by the UPF.

In 1010e, the SMF sends a tunnel creation message (Create Tunnel) (the GW address, the tunnel label) to the UPF, where the tunnel creation message includes the GW address and the tunnel label; and configures the NHLFE/FIB/ILM entries on the UPF, so that the per node tunnel is created.

In 1020, when the session is being created, the SMF obtains UE MAC address information bound to the session.

For a specific procedure in which the UPF obtains the UE MAC address information bound to the session, refer to related descriptions in the method 700 and the method 800. To avoid repetition, details are not described herein again.

In 1030a, the SMF obtains a session DNN, and obtains tunnel information.

Optionally, the SMF may assign a VC label, and associate the VC label with MAC address information bound to the session.

In 1030b, the SMF and the DN GW synchronize information by using LDP/MBGP signaling, where the synchronized information includes the VC label, the tunnel label, and the UE MAC address information that is bound to the session, where the VC label is optional. The LDP/MBGP signaling is forwarded by the UPF.

In 1030c, the DN GW receives the MAC address information (and VC label information) bound to the session, and updates a route to the UPF.

In 1040, the SMF sends an N4 message to the UPF, where the N4 message includes a session ID, the tunnel label/VC label, and the UE MAC address information bound to the session, where the VC label is optional; and the UPF receives the N4 message, and updates the tunnel information.

In 1050, the DN GW maps DL data to a tunnel label (and a VC label) of a per node tunnel based on a destination MAC address, adds the labels to the downlink data, and transmits the downlink data to the UPF through the tunnel. The UPF maps the data to different sessions based on the destination MAC address. If the VC label is carried, the data may be mapped to different sessions based on the VC label.

Therefore, in this embodiment of this application, when constructing the PVN, the PVN manager instructs the DN GW and the SMF to create the per node tunnel, and when the session is being created, the mapping relationship between the UE MAC address and the tunnel is updated between the SMF and the DN, the SMF sends the configured tunnel identifier information to the UPF, and the UPF assigns the tunnel identifier based on the tunnel identifier information sent by the SMF, to establish an interface route between the UPF and the DN.

Figure 11A:
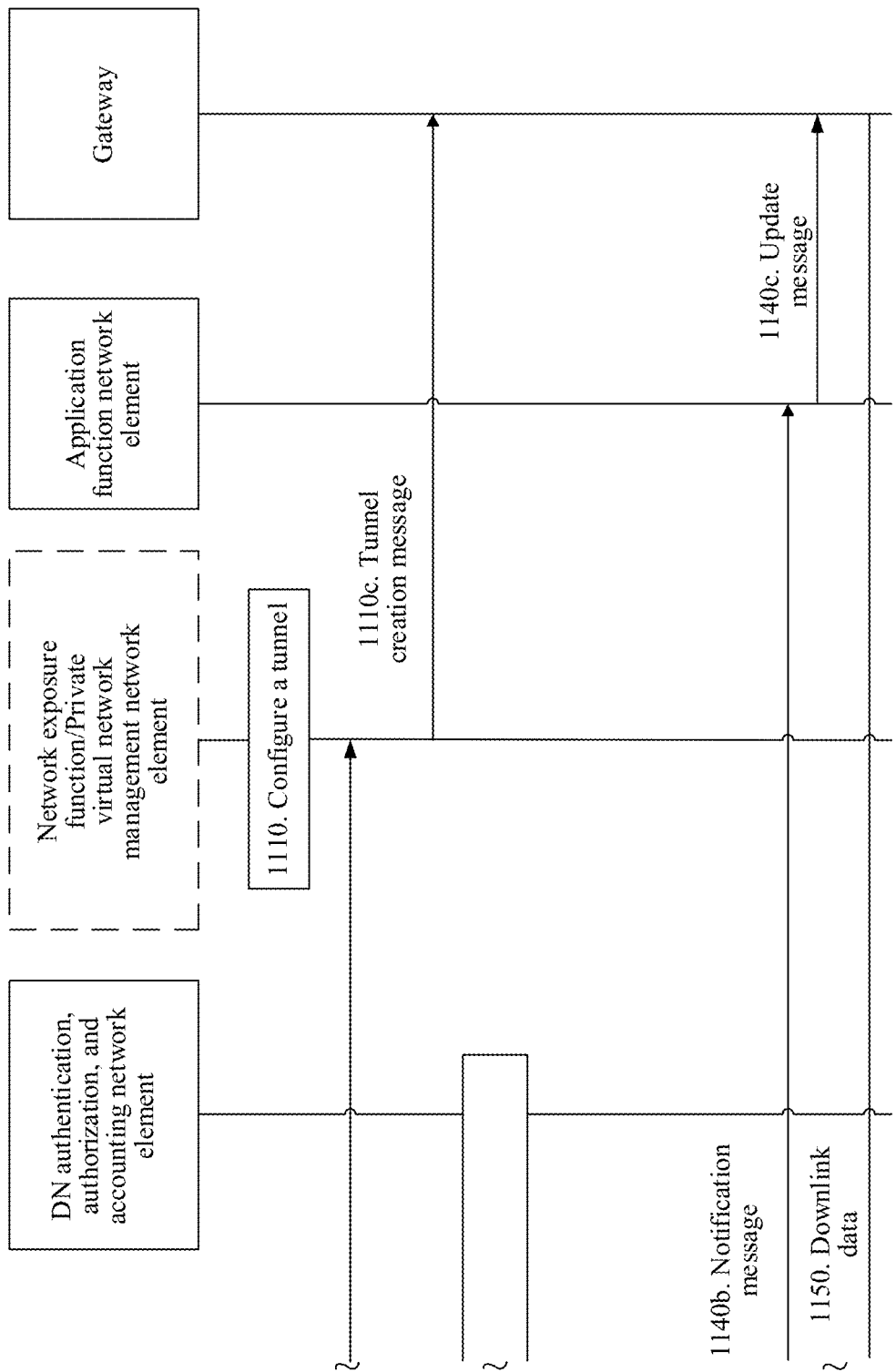
FIG. 11A and FIG. 11B are a schematic flowchart of a communication method according to this application.
Figure 11B:
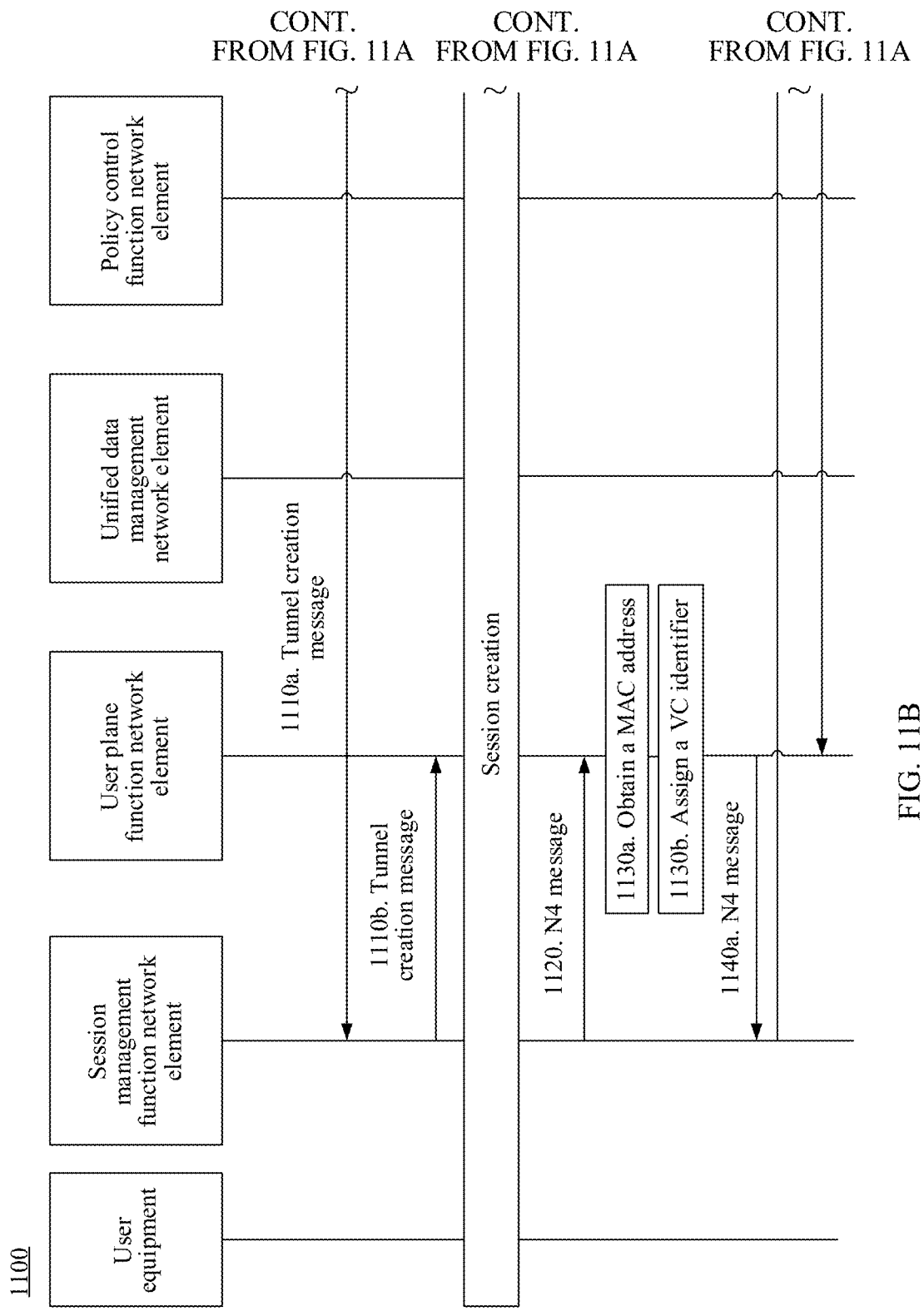

FIG. 11A and FIG. 11B are a schematic flowchart of a communication method 1100 according to an embodiment of this application. The method 1100 may be applied to the architecture shown in FIG. 2. A main difference between the procedure shown in FIG. 11A and FIG. 11B and the method 900 lies in that LDP/MBLG signaling negotiation tunnel information is not supported between a UPF and a DN GW, and a peer end needs to be notified by using signaling plane information. The method 1100 includes the following content.

In 1110, when constructing a PVN, a PVN manager configures a per node tunnel from the DN GW (Switch/Router) to the UPF based on a topology structure of the PVN, where the tunnel may be a GRE tunnel or an LSP tunnel. If the LSP tunnel is used, because the LSP Label is unidirectional, an in tunnel label and an out tunnel label need to be maintained at two ends of the tunnel. There are two methods for assigning the tunnel labels: Method 1: All the tunnel labels are assigned by the PVN manager. Method 2: The tunnel labels are respectively assigned by a UPF/SMF and a GW controller/DN GW, and then are synchronized by the PVN manager. Exchange signaling in this method is more than that in the first method. Therefore, Method 1 is used in this embodiment.

In 1110a, the PVN manager sends a tunnel creation create tunnel message to the SMF. The tunnel creation message may include parameters such as a DN ID, a tunnel type, and a UPF ID list, and the parameter tunnel type is an optional parameter. The tunnel type indicates that a type of a tunnel is GRE, LSP, or the like. The DN ID indicates the DN in which the DN GW is located. The UPF ID list indicates the UPF that needs to create the per node tunnel with the DN GW.

Optionally, the tunnel creation message may be forwarded by a PCF/an NEF. After receiving the message, the PCF/NEF may distribute the message to a corresponding SMF based on the UPF ID list included in the tunnel creation message.

In 1110b, the SMF sends a tunnel creation message (Create Tunnel) to the UPF, where the create tunnel message includes the DN ID and the tunnel type, or the create tunnel message includes a DN GW address and the tunnel type. The DN ID and the tunnel type are indicated by the PVN manager, and the UPF to which the tunnel creation message is sent is indicated by a UPF ID on the UPF ID list. If the SMF can determine the DN GW address based on the DN ID, the SMF may replace the DN ID with the DN GW address.

In 1110c, the PVN manager sends a tunnel creation message (Create Tunnel) to the DN GW, where the tunnel creation message may include destination information and the tunnel type, and the destination information is a DNAI/FQDN/VLAN ID/routing profile ID or the like. The parameter tunnel type is optional, and the tunnel type is used to indicate that a type of the tunnel is GRE, LSP, or the like. Optionally, the tunnel creation message may be forwarded to the DN GW through an AF. The DN GW and the UPF are statically configured by using the PVN manager, and respective NHLFE/FIB/ILM entries are updated, so that the per node tunnel is created.

In 1120, when a session is being created, the SMF obtains a session DNN, and sends an N4 message to the UPF, where the N4 message includes a session ID, a DNN, or tunnel information.

It should be understood that if the SMF can obtain the tunnel information based on the DNN (DN ID), the tunnel information may be carried; otherwise, the DNN is carried.

In 1130a, the UPF obtains UE MAC address information bound to the session. For a specific procedure in which the UPF obtains the UE MAC address information bound to the session, refer to related descriptions in the method 700 and the method 800. To avoid repetition, details are not described herein again.

In 1130b, the UPF may assign a VC label, and associate the VC label with MAC address information bound to the session. 1130b is an optional step.

In 1140a, the UPF sends an N4 message to the SMF, where the N4 message includes a session ID, the tunnel label/VC label, and the UE MAC address information bound to the session, where the VC label is optional.

In 1140b, the SMF sends a notification message to the AF, where the notification message includes the MAC addresses bound to the session, the tunnel label, and the VC label, and the VC label is optional. Optionally, the notification message may be forwarded by using the NEF/PVN manager.

In 1140c, the AF updates a mapping relationship between tunnel information in the DN GW and the MAC address bound to the session, and sends an update message, where the update message includes the MAC addresses bound to the session, the tunnel label, and the VC label, and the VC label is optional.

In 1150, the DN GW maps DL data to a tunnel label (and a VC label) of a per node tunnel based on a destination MAC address, adds the labels to the downlink data, and transmits the downlink data to the UPF through the tunnel. The UPF maps the data to different sessions based on the destination MAC address. If the VC label is carried, the data may be mapped to different sessions based on the VC label.

Therefore, in this embodiment of this application, when LDP/MBLG signaling negotiation tunnel information is not supported between the UPF and the DN GW, when constructing the PVN, the PVN manager needs to notify a peer end by using signaling plane information, to instruct the DN GW and the UPF to create the per node tunnel, when the session is being created, the notification message from the SMF to the AF carries the tunnel information and the MAC address information that is bound to the session, to update a route between the UPF and the DN GW.

Figure 12A:
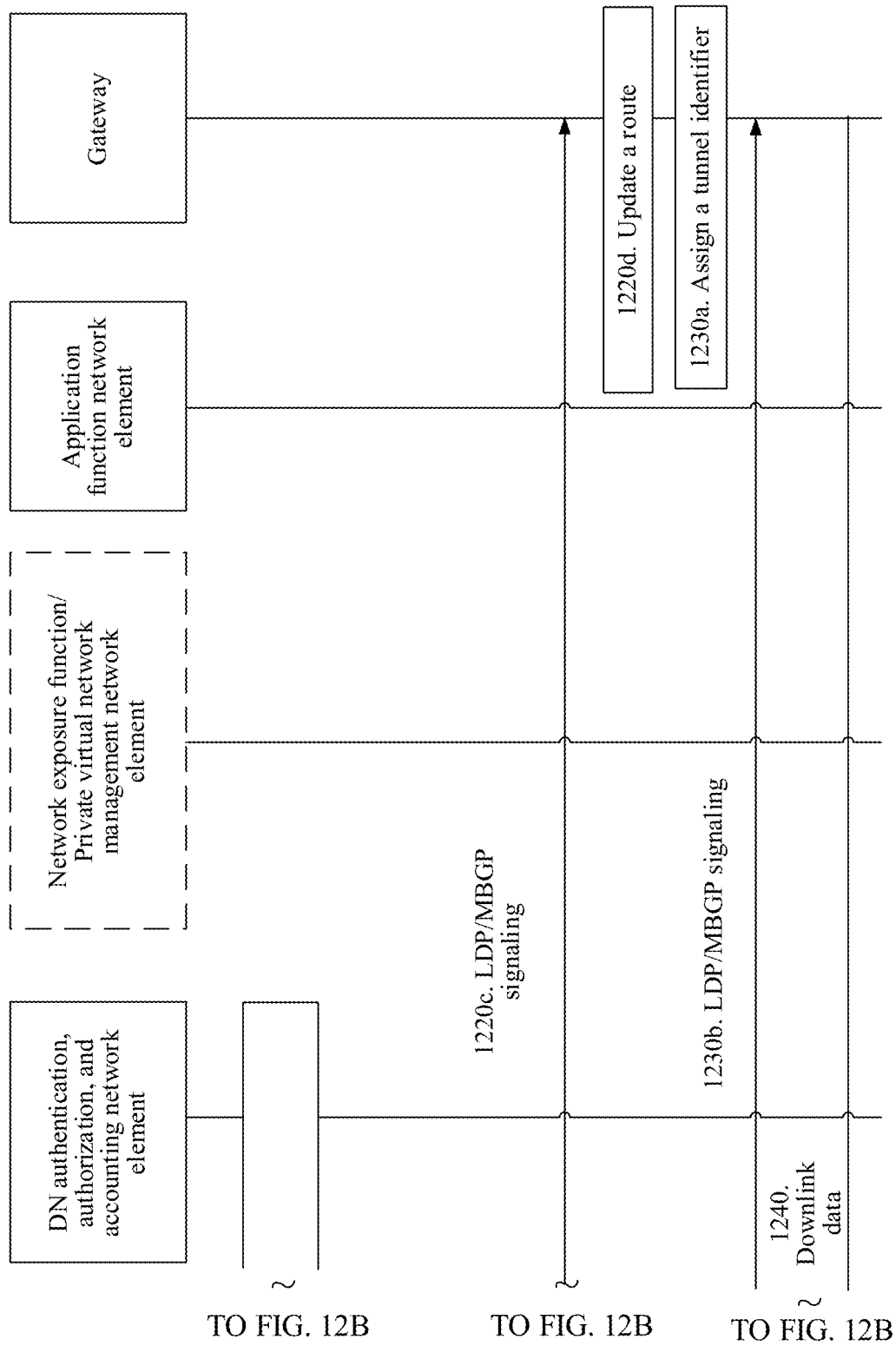
FIG. 12A and FIG. 12B are a schematic flowchart of a communication method according to this application.
Figure 12B:
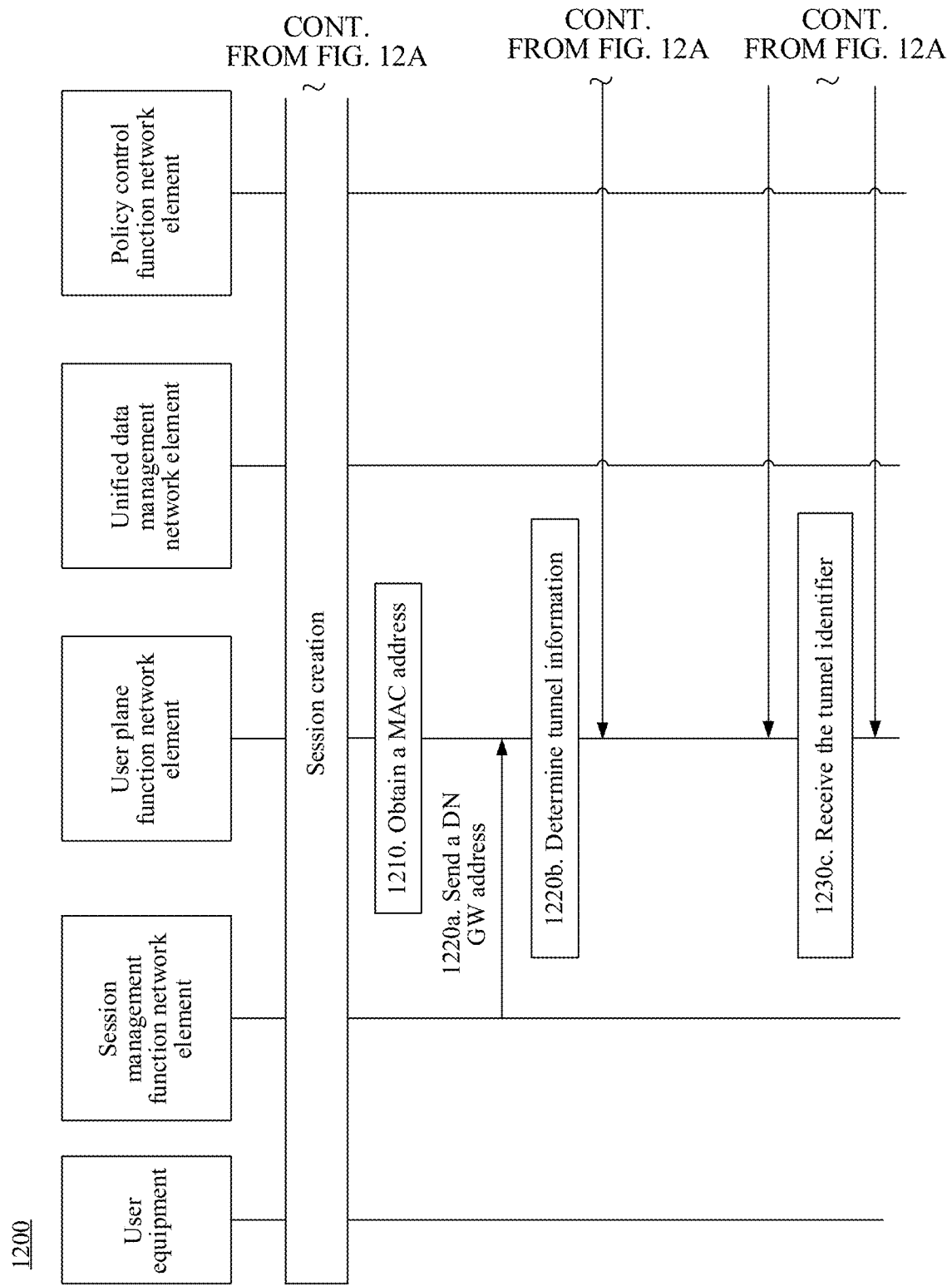

FIG. 12A and FIG. 12B are a schematic flowchart of a communication method 1200 according to an embodiment of this application. The method 1200 may be applied to the architecture shown in FIG. 2. A main difference between the procedure shown in FIG. 12A and FIG. 12B and the method 900 lies in that a per session tunnel is created between a UPF and a DN GW, and a tunnel between the UPF and the DN GW needs to be created when a session is being created. As shown in FIG. 12A and FIG. 12B, the method 1200 includes the following content.

In 1210, when the session is being created, the UPF obtains UE MAC address information bound to the session.

For a specific procedure in which the UPF obtains the UE MAC address information bound to the session, refer to related descriptions in the method 700 and the method 800. To avoid repetition, details are not described herein again.

In 1220*a*, an SMF obtains a session DNN, determines a DN GW address, and sends the DN GW address to the UPF.

In 1220*b*, the UPF determines tunnel information, for example, a tunnel label or a VC label, and associates the tunnel information with the UE MAC address information bound to the session.

In 1220*c*, the UPF notifies the DN GW by using LDP/MBGP signaling, where the LDP/MBGP signaling includes a tunnel label, a VC label, and the UE MAC address that is bound to the session, and the VC label is optional.

In 1220*d*, the DN GW receives the LDP/MBGP signaling and updates a route to the UPF.

In 1230*a*, the DN GW assigns the tunnel label and the VC label.

In 1230*b*, the DN GW notifies the UPF by using the LDP/MBGP signaling, where the LDP/MBGP signaling includes the tunnel label and the VC label.

In 1230*c*, the UPF receives the tunnel label and the VC label that are assigned by the DN GW, and updates an NHLFE/FIB/ILM entry, to complete creation of the per session tunnel.

In 1240, the DN GW maps DL data to a tunnel label (and a VC label) of a per session tunnel based on a destination MAC address, adds the labels to the downlink data, and transmits the downlink data to the UPF through the tunnel. The UPF maps the downlink data to different sessions based on the tunnel label.

Therefore, in this embodiment of this application, if a per session tunnel is created between the UPF and the DN GW, the tunnel between the UPF and the DN GW is created when the session is being created, so that an interface route between the UPF and the DN is established.

Figure 13:
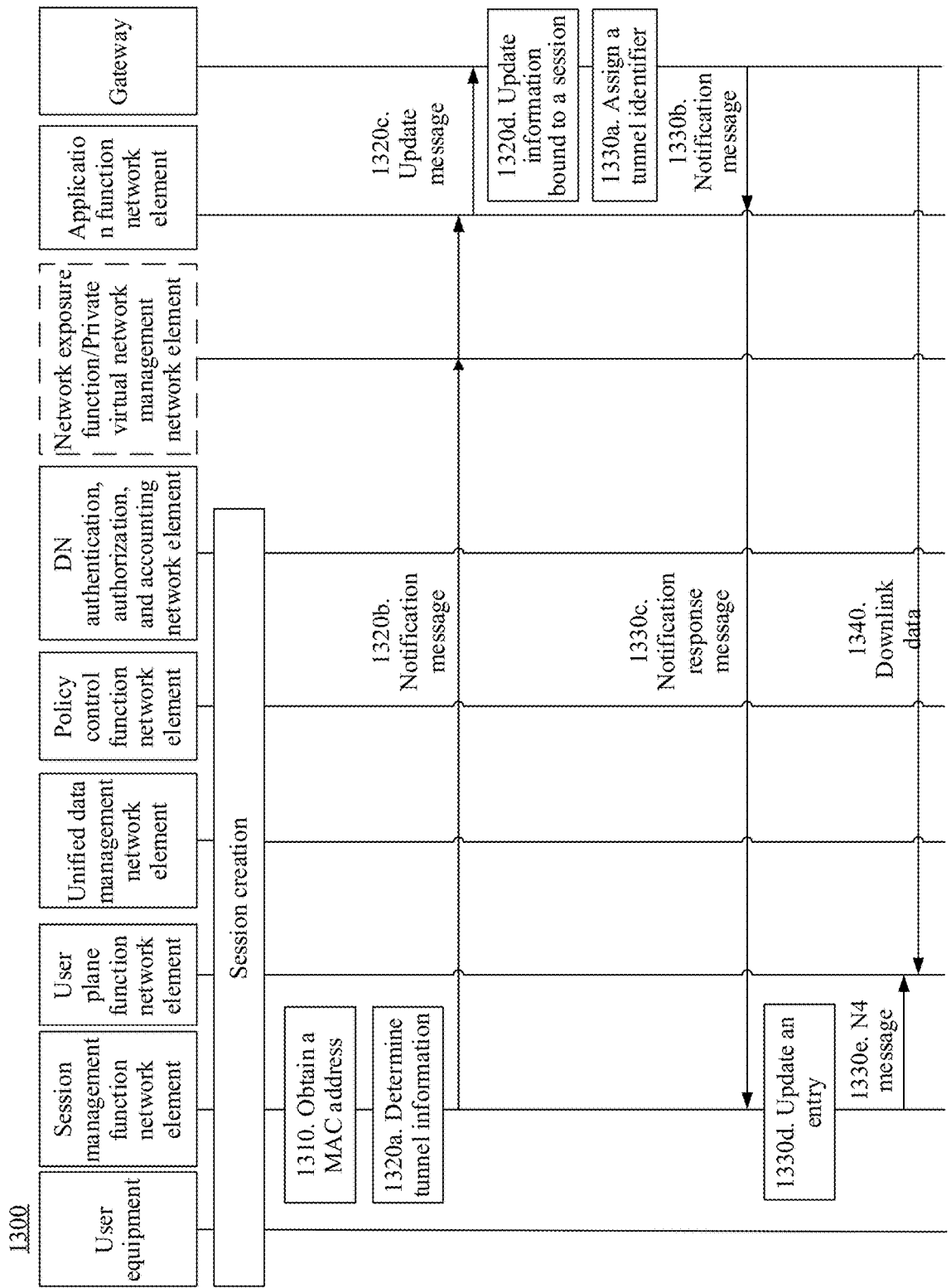
FIG. 13 is a schematic flowchart of a communication method according to this application.

FIG. 13 is a schematic flowchart of a communication method 1300 according to an embodiment of this application. The method 1300 may be applied to the architecture shown in FIG. 2. A main difference between the procedure shown in FIG. 13 and the method 900 lies in that a per session tunnel is created between a UPF and a DN GW, and the tunnel between the UPF and the DN GW needs to be created when a session is being created. In addition, LDP/MBLG signaling negotiation tunnel information is not supported between the UPF and the DN GW, and a peer end needs to be notified by using signaling plane information. As shown in FIG. 13, the method 1300 includes the following content.

In 1310, when the session is being created, the UPF obtains UE MAC address information bound to the session.

For a specific procedure in which the SMF obtains the UE MAC address information bound to the session, refer to related descriptions in the method 700 and the method 800. To avoid repetition, details are not described herein again.

In 1320*a*, the SMF determines tunnel information, for example, a tunnel label or a VC label, and associates the tunnel information with the UE MAC address information bound to the session; and the SMF obtains a session DNN, and determines a DN GW address.

In 1320*b*, the SMF sends a notification message to an AF, where the notification message includes a MAC address bound to the session, a tunnel label, destination information, and a VC label, and the VC label is optional.

Optionally, the message may be forwarded by using an NEF/a PVN manager. The destination information includes a DNAI/UPF ID/UPF address/FQDN/interface ID/VLAN ID/routing profile ID and the like, and is used by the AF to determine a destination address to which downlink data is routed. After receiving the destination information, the NEF/PVN manager may map an identifier in the 3GPP network to an identifier in a DN, to hide a topology and user information in the 3GPP network, and convert information in the 3GPP network to information available on an AF side. For example, the UPF ID/UPF address/interface ID and the like are mapped to the DNAI or the routing profile ID.

In 1320*c*, the AF updates a mapping relationship between tunnel information in the DN GW and the MAC address bound to the session, and sends an update message, where the update message includes the MAC address bound to the session, the tunnel label, the destination information, and the VC label, and the VC label is optional.

In 1320*d*, after receiving the update message, the DN GW updates the mapping relationship between MAC address information bound to the session and the tunnel information.

In 1330*a*, the DN GW assigns the tunnel label and the VC label.

In 1330*b*, the DN GW sends a notify message to the AF, where the notify message includes the tunnel label and the VC label.

In 1330*c*, the AF sends a notification response message (notify Ack) to the SMF, where the notify Ack message includes the tunnel label and the VC label.

In 1330*d*, the SMF receives the tunnel label and the VC label that are assigned by the DN GW, and configures the UPF to update an NHLFE/FIB/ILM entry.

In 1330*e*, the SMF sends an N4 message to the UPF, where the N4 message includes a session ID, the MAC address information bound to the session, and the tunnel label/VC label. The per session tunnel has been created.

In 1340, the DN GW maps DL data to a tunnel label (and a VC label) of a per node tunnel based on a destination MAC address, adds the labels to the downlink data, and transmits the downlink data to the UPF through the tunnel. The UPF maps data to different sessions based on the tunnel label.

Therefore, in this embodiment of this application, when LDP/MBLG signaling negotiation tunnel information is not supported between the UPF and the DN GW, a peer end needs to be notified by using signaling plane information, to instruct the DN GW and the UPF to create a tunnel and update a route between the UPF and the DN GW.

Figure 14:
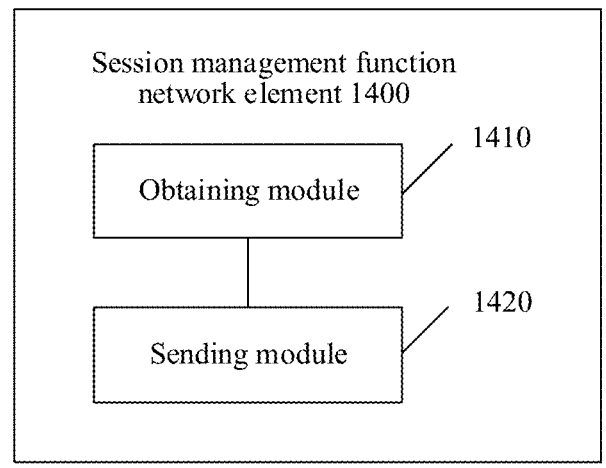
FIG. 14 is a schematic block diagram of a session management function network element according to an embodiment of this application.

FIG. 14 is a schematic block diagram of a session management function network element 1400 according to this application. As shown in FIG. 14, the session management function network element 1400 includes the following modules:

an obtaining module 1410, configured to obtain a media access control (MAC) address that is of a terminal device and that is bound to a session and first route information of an interface, corresponding to the session, between a user plane function network element and a data network; and a sending module 1420, configured to send, to an application function network element or a gateway of the data network, the MAC address that is of the terminal device and that is bound to the session and the first route information.

Optionally, the obtaining module 1410 and the sending module 1420 are configured to perform operations of the session management function network element in the communication method 300 to the communication method 1300 in this application. For brevity, details are not described herein again.

Figure 15:
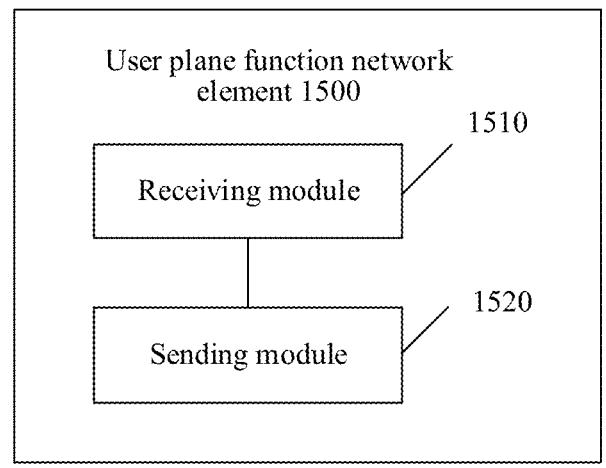
FIG. 15 is a schematic block diagram of a user plane function network element according to an embodiment of this application.

FIG. 15 is a schematic block diagram of a user plane function network element 1500 according to this application. As shown in FIG. 15, the user plane function network element 1500 includes the following modules:

a receiving module 1510, configured to receive downlink data sent by a gateway of a data network; and a sending module 1520, configured to map, based on first route information of an interface, corresponding to a session, between a user plane function network element and the data network, or a plurality of media access control (MAC) addresses that are of a terminal device and that are bound to a session and a destination MAC address of the downlink data, the downlink data to the session for transmission.

Optionally, the receiving module 1510 and the sending module 1520 are configured to perform operations of the user plane function network element in the communication method 300 to the communication method 1300 in this application. For brevity, details are not described herein again.

Figure 16:
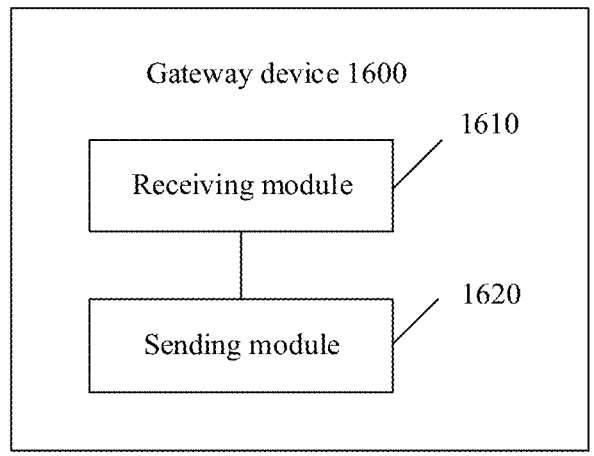
FIG. 16 is a schematic block diagram of a gateway device of a data network according to an embodiment of this application.

FIG. 16 is a schematic block diagram of a gateway device 1600 of a data network according to this application. As shown in FIG. 16, the gateway device 1600 includes the following modules:

a receiving module 1610, configured to receive downlink data in the data network; and a sending module 1620, configured to map, based on a destination media access control (MAC) address of the downlink data and first route information of an interface between a user plane function network element and the data network, the downlink data to a corresponding path for transmission to the user plane function network element.

The first route information includes a MAC address that is of a terminal device and that is bound to a session and tunnel information corresponding to the session, or the first route information includes a MAC address that is of a terminal device and that is bound to a session and information about a interface of a switch corresponding to the session.

Optionally, the obtaining module 1610 and the sending module 1620 are configured to perform operations of the gateway of the data network in the communication method 300 to the communication method 1300 in this application. For brevity, details are not described herein again.

Figure 17:
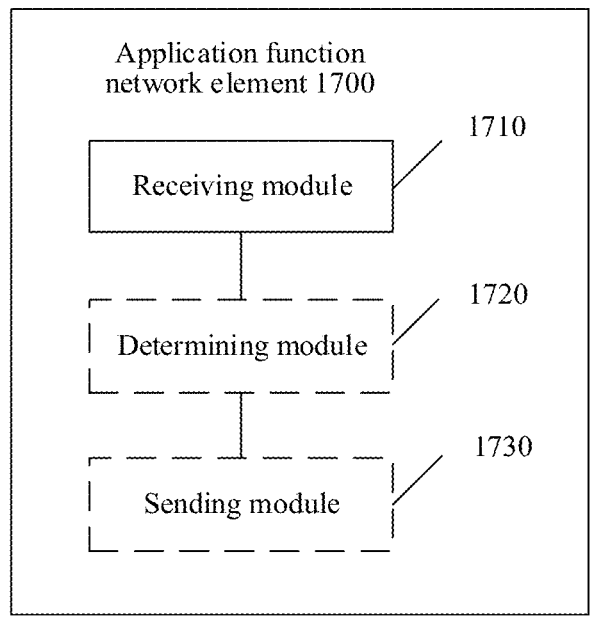
FIG. 17 is a schematic block diagram of an application function network element according to an embodiment of this application.

FIG. 17 is a schematic block diagram of an application function network element 1700 according to this application. As shown in FIG. 17, the application function network element 1700 includes the following module:

a receiving module 1710, configured to receive a notification message sent by a session management function network element, where the notification message includes MAC address information that is of a terminal device and that is bound to a session and destination information, or the notification message includes MAC address information that is of a terminal device and that is bound to a session and first identification information of a tunnel through which a user plane function network element is connected to a gateway, and the destination information is used by the application function network element to determine a destination address to which downlink data is routed.

Optionally, when the notification message includes the MAC address information that is of the terminal device and that is bound to the session and the destination information, the application function network element 1700 further includes:

a determining module 1720, configured to determine, based on the destination information, a switch that needs to be passed through from a data network to the destination address and a next-hop interface of the switch; and a sending module 1730, configured to send an update message to the switch, where the update message includes the MAC address information that is of the terminal device and that is bound to the session and the next-hop interface of the switch.

Optionally, when the notification message includes the MAC address information that is of the terminal device and that is bound to the session and the first identification information of the tunnel through which the user plane function network element is connected to the gateway of the data network, the sending module 1730 is configured to send, to the gateway of the data network, the MAC address information that is of the terminal device and that is bound to the session and the first identification information of the tunnel through which the user plane function network element is connected to the gateway of the data network.

Optionally, the receiving module 1710, the determining module 1720, and the sending module 1730 are configured to perform operations of the application function network element in the communication method 300 to the communication method 1300 in this application. For brevity, details are not described herein again.

The session management function network element, the user plane function network element, the gateway device, and the application function network element completely correspond to the session management function network element, the user plane function network element, the gateway device, and the application function network element in the method embodiments. Corresponding modules perform corresponding steps. For details, refer to the corresponding method embodiments.

Figure 18:
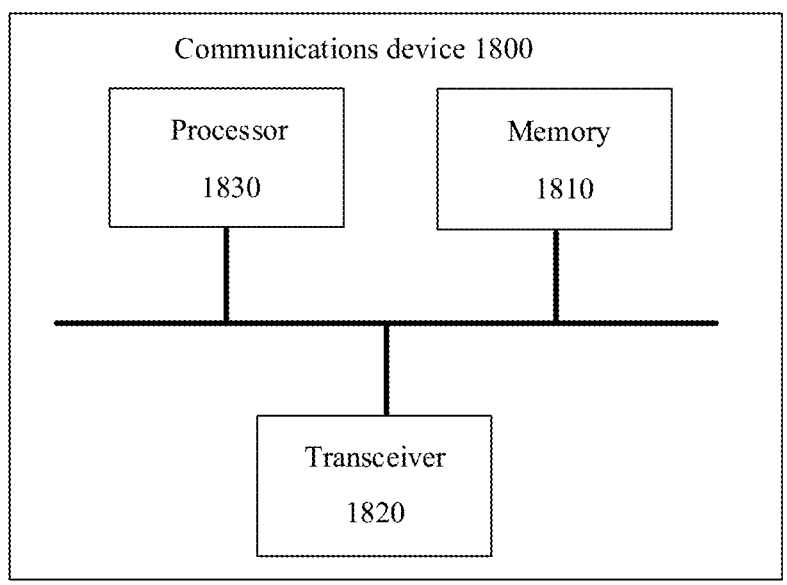
FIG. 18 is a schematic block diagram of a communications device according to an embodiment of this application.

FIG. 18 is a schematic block diagram of a communications device 1800 according to this application. The communications device 1800 includes:

a memory 1810, configured to store a program, where the program includes code;

a transceiver 1820, configured to communicate with another device; and a processor 1830, configured to execute the program code in the memory 1810.

Optionally, when the code is executed, the processor 1830 may implement operations of the method 300 to the method 1300. For brevity, details are not described herein again. The transceiver 1820 is configured to specifically send and receive signals while driven by the processor 1830.

The communications device 1800 may be any one of the session management function network element, the user plane function network element, the gateway device, and the application function network element, and perform operations of the determining module. The transceiver may include a transmitter and/or a receiver, which respectively perform corresponding steps of the sending module and the receiving module.

This application further provides a communications system. The communications system includes: a session management function network element, a user plane function network element, a gateway device, and an application function network element.

Optionally, the system may further include another network element. The another network element included in this system is not limited in this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication system, wherein the system comprises a session management function network element device and an application function network element device; wherein the session management function network element device is configured to:
obtain a media access control (MAC) address of a terminal and first route information of an interface between a user plane function network element device and a data network, wherein the MAC address is bound to a session, and the interface corresponds to the session; and
send the MAC address and the first route information to the application function network element device;
wherein the application function network element device is configured to:
receive the MAC address and the first route information from the session management function network element device; and
determine a transmission path of downlink data based on the first route information, wherein the transmission path is a path from the data network to the user plane function network element device.

2. The communication system according to claim 1, wherein the communication system further comprises the user plane function network element device, wherein the user plane function network element device is configured to:
detect the MAC address of the terminal; and
send the MAC address to the session management function network element device;
wherein the session management function network element device is configured to receive the MAC address.

3. The communication system according to claim 1, wherein the first route information of the interface comprises:
first identification information of a tunnel associated with the session, or
destination information indicating a destination address to which the downlink data is routed.

4. The communication system according to claim 1, wherein a destination MAC address of the downlink data is the same as the MAC address.

5. The communication system according to claim 1, wherein the terminal is a terminal requesting to create the session.

6. The communication system according to claim 1, wherein the terminal is a terminal accessing the session by using a second terminal, and the second terminal is a terminal requesting to create the session.

7. The communication system according to claim 1, wherein the interface is an N6 interface.

8. A communication method, comprising:
obtaining, by a session management function network element device, a media access control (MAC) address of a terminal and first route information of an interface between a user plane function network element device and a data network, wherein the MAC address is bound to a session, and the interface corresponds to the session;
sending, by the session management function network element device, the MAC address and the first route information to an application function network element device;
receiving, by the application function network element device, the MAC address and the first route information from the session management function network element device; and
determining, by the application function network element device, a transmission path of downlink data based on the first route information, wherein the transmission path is a path from the data network to the user plane function network element device.

9. The method according to claim 8, wherein the obtaining, by a session management function network element device, a media access control (MAC) address of a terminal comprises:
receiving, by the session management function network element device, the MAC address from the user plane function network element device.

10. The method according to claim 8, wherein the first route information of the interface comprises:
first identification information of a tunnel associated with the session, or
destination information indicating a destination address to which the downlink data is routed.

11. The method according to claim 8, wherein a destination MAC address of the downlink data is the same as the MAC address.

12. The method according to claim 8, wherein the terminal is a terminal requesting to create the session.

13. The method according to claim 8, wherein the terminal is a terminal accessing the session by using a second terminal, and the second terminal is a terminal requesting to create the session.

14. The method according to claim 8, wherein the interface is an N6 interface.

15. An apparatus, comprising:
at least one processor; and
one or more memories coupled to the at least one processor and storing programming for execution by the at least one processor, the programming instructing the at least one processor to perform operations comprising:
receiving a notification message from a session management function network element device, wherein the notification message comprises a media access control (MAC) address of a terminal and first route information of an interface between a user plane function network element device and a data network, wherein the MAC address is bound to a session, and the interface corresponds to the session; and
determining a transmission path of downlink data based on the first route information; wherein the transmission path is a path from the data network to the user plane function network element device.

16. The apparatus according to claim 15, wherein the first route information of the interface comprises:
first identification information of a tunnel associated with the session, or
destination information indicating a destination address to which the downlink data is routed.

17. The apparatus according to claim 15, wherein a destination MAC address of the downlink data is the same as the MAC address.

18. The apparatus according to claim 15, wherein the terminal is a terminal requesting to create the session.

19. The apparatus according to claim 15, wherein the terminal is a terminal accessing the session by using a second terminal, and the second terminal is a terminal requesting to create the session.

20. The apparatus according to claim 15, wherein the interface is an N6 interface.

* * * * *